(12) United States Patent
Shapiro et al.

(10) Patent No.: US 12,321,152 B2
(45) Date of Patent: Jun. 3, 2025

(54) ENCLOSURE WITH SELECTIVE WAVELENGTH TRANSMISSIVITY FOR COMPUTER NUMERICALLY CONTROLLED FABRICATION

(71) Applicant: Glowforge Inc., Seattle, WA (US)

(72) Inventors: Daniel Shapiro, Mercer Island, WA (US); Mark Gosselin, Seattle, WA (US); Douglas Webster, Mill Creek, WA (US)

(73) Assignee: Glowforge Inc., Seattle, WA (US)

( * ) Notice: Subject to any disclaimer, the term of this patent is extended or adjusted under 35 U.S.C. 154(b) by 326 days.

(21) Appl. No.: 17/967,850

(22) Filed: Oct. 17, 2022

(65) Prior Publication Data
US 2023/0185279 A1   Jun. 15, 2023

Related U.S. Application Data

(60) Provisional application No. 63/256,380, filed on Oct. 15, 2021.

(51) Int. Cl.
*G05B 19/4155* (2006.01)
(52) U.S. Cl.
CPC .......... *G05B 19/4155* (2013.01); *G05B 2219/33099* (2013.01)

(58) Field of Classification Search
None
See application file for complete search history.

(56) References Cited

U.S. PATENT DOCUMENTS

2010/0213391 A1* 8/2010 Schreiber .............. H01S 3/0014
250/487.1

* cited by examiner

*Primary Examiner* — Ryan A Jarrett
(74) *Attorney, Agent, or Firm* — Lee Sullivan Shea & Smith LLP

(57) ABSTRACT

A computer numerically controlled machine may include a source configured to deliver an electromagnetic energy to at least one location within an interior space of the computer-numerically-controlled machine. The electromagnetic energy may have a first range of wavelengths from a visible spectrum. An enclosure defining at least a portion of the interior space of the computer numerically controlled machine may include a transparent portion configured to filter the first range of wavelengths associated with the electromagnetic energy. Moreover, the transparent portion may reflect and/or transmit at least a second range of wavelengths from the visible spectrum not associated with the electromagnetic energy such that the transparent portion of the enclosure exhibits a first color corresponding to the second range of wavelengths.

20 Claims, 12 Drawing Sheets

ENCLOSURE WITH SELECTIVE WAVELENGTH TRANSMISSIVITY FOR COMPUTER NUMERICALLY CONTROLLED FABRICATION

CROSS-REFERENCE TO RELATED APPLICATIONS

This application claims priority to U.S. Provisional Application No. 63/256,380, filed on Oct. 15, 2021 and titled "Enclosure with Selective Wavelength Transmissivity for Computer Numerically Controlled Fabrication," which is incorporated herein by reference in its entirety.

TECHNICAL FIELD

The subject matter described herein relates generally to computer numerically controlled fabrication and more specifically to various techniques for containment of electromagnetic energy during computer numerically controlled fabrication.

BACKGROUND

Computer controlled manufacturing systems, such as "3-D printers," laser cutter/engravers, computer numerically controlled milling machines, and the like, can be used to fabricate complicated objects where traditional manufacturing techniques like moldings or manual assembly fail. Such automated methods operate based on instructions that specify the cuts, engravings, patterns, and other actions to be performed. The instructions can be in the form of computer files transferred to the memory of a computer controller for the machine and interpreted at run-time to provide a series of steps in the manufacturing process.

SUMMARY

Systems, methods, and articles of manufacture, including apparatuses, are provided for an enclosure with selective wavelength transmissivity for a computer numerically controlled machine. In one aspect, there is provided a computer numerically controlled machine that includes: a source configured to deliver an electromagnetic energy to at least one location within an interior space of the computer-numerically-controlled machine, the electromagnetic energy having a first range of wavelengths from a visible spectrum; and an enclosure defining at least a portion of the interior space of the computer numerically controlled machine, the enclosure including a transparent portion configured to filter the first range of wavelengths associated with the electromagnetic energy, the transparent portion further configured to reflect and/or transmit at least a second range of wavelengths from the visible spectrum not associated with the electromagnetic energy such that the transparent portion of the enclosure exhibits a first color corresponding to the second range of wavelengths.

In some variations, one or more features disclosed herein including the following features can optionally be included in any feasible combination. The transparent portion of the enclosure may include a material configured to filter the first range of wavelengths associated with the electromagnetic energy and transmit the second range of wavelengths not associated with the electromagnetic energy.

In some variations, the transparent portion of the enclosure may include a first material that is configured to filter the first range of wavelengths associated with the electromagnetic energy and transmit a third range of wavelengths in the visible spectrum associated with an interior lighting of the computer numerically controlled machine.

In some variations, the transparent portion of the enclosure may further include a second material configured to reflect the second range of wavelengths associated with an ambient light around the computer numerically controlled machine.

In some variations, the second material may be further configured to filter the third wavelength of light associated with the internal lighting such that the transparent portion of the enclosure exhibits the first color even in the presence of the interior lighting.

In some variations, the second material may be further configured to transmit the third range of wavelengths associated with the internal lighting such that the transparent portion of the enclosure further exhibits a second color corresponding to a combination of the second range of wavelength associated with the ambient light and the third range of wavelength associated with the interior lighting.

In some variations, the transparent portion of the enclosure may be further configured to exhibit a third color by changing a color of the interior lighting and/or a placement of the interior lighting.

In some variations, the first color and/or the second color may be achieved by changing a color of a light reflected off one or more surfaces within the interior space of the computer numerically controlled machine.

In some variations, the first color and the second color may correspond to different modes of operation.

In some variations, the computer numerically controlled machine may further include: a controller configured to detect, based at least on data from one or more sensors, a change in the interior lighting and/or the ambient light, and adjust, based at least on the change in the interior lighting and/or the ambient light, the one or more optical properties of the transparent portion of the enclosure.

In some variations, the controller may be further configured to adjust, based at least on a first color of the ambient light, a second color of the interior lighting such that the transparent portion of the enclosure exhibits a same color when the ambient light undergoes change.

In some variations, the adjusting may include applying, to the first material and/or the second material, a voltage to change a light permeability of the transparent portion of the enclosure.

In some variations, the transparent portion of the enclosure may be formed by disposing a layer of the second material on a layer of the first material through one or more of a double-shot molding, a surface treatment, and/or a coating.

In some variations, the transparent portion of the enclosure may include a first material in which a plurality of particles of a second material are dispersed. The plurality of particles may be configured to diffuse the first range of wavelengths associated with the electromagnetic energy.

In some variations, the first material and/or the second material may be configured to absorb the first range of wavelengths associated with the electromagnetic energy.

In some variations, the first material may have a different index of refraction than the second material.

In some variations, a dimension and/or a mean dimension of the plurality of particles may be less than the first range of wavelengths associated with the electromagnetic energy.

In some variations, a surface of the transparent portion of the enclosure may be textured to achieve one or more of the filtering of the first range of wavelengths, the reflection of the second range of wavelengths, and the transmission of the second range of wavelengths.

In some variations, the source may include a diode, a gas laser source, and/or a fiber laser source.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, a connection over a network (e.g. the Internet, a wireless wide area network, a local area network, a wide area network, a wired network, or the like), via a direct connection between one or more of the multiple computing systems, and/or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to an enclosure with selective wavelength transmissivity for a computer numerically controlled machine, it should be readily understood that such features are not intended to be limiting.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1A:
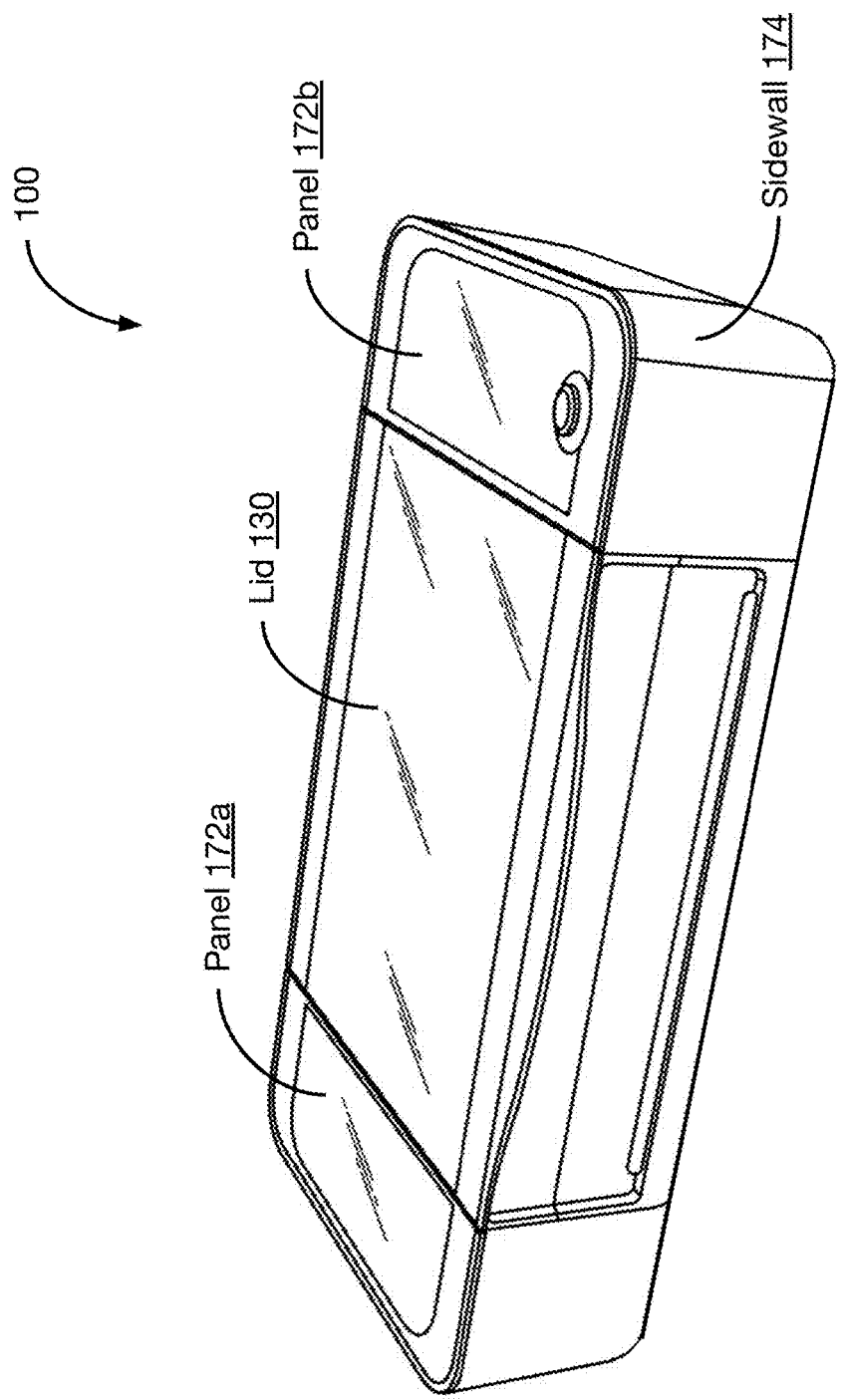
FIG. 1A depicts a perspective view of an example of a computer numerically controlled machine consistent with some implementations of the current subject matter.

When practical, similar reference numbers denote similar structures, features, or elements. DETAILED DESCRIPTION A computer numerically controlled machine may include a source configured to emit electromagnetic energy, for example, in the form of a laser. Electromagnetic energy from the source may be routed to a head configured to deliver the electromagnetic energy to a destination such as, for example, a portion of a material positioned in a working area defined by limits within which the head is commanded to cause delivery of the electromagnetic energy. The working area may be inside an interior space of the computer numerically controlled machine, which may be defined by an enclosure including an openable barrier such as a lid, a door, a hatch, a flap, and/or the like. Electromagnetic energy escaping from the computer numerically controlled machine may pose significant hazards including damage to nearby objects and injury to human operators. As such, the enclosure may be configured to attenuate the transmission of electromagnetic energy between the interior space and an exterior of the computer numerically controlled machine.

In addition to filtering out harmful wavelengths of the electromagnetic energy generated by the computer numerically controlled machine, it may be desirable for at least some portions of the enclosure to be transparent such that the interior space of the computer numerically controlled machine is visible to a user. A partially transparent enclosure, such as an enclosure with a transparent lid and/or a transparent sidewall, may be advantageous for a number of reasons including, for example, safety (e.g., visually identify fires and/or other thermal events), effectiveness (e.g., visual checks to ensure that processing is happening as intended), product requirements (e.g., transparency to enhance the quality of user interactions with the computer numerically controlled machine), and/or the like.

In some implementations of the current subject matter, at least a portion of the enclosure may be formed from one or more materials exhibiting a selective wavelength transmissivity (and/or reflectivity) such that the portion of the enclosure is transparent while still capable of attenuating the transmission of electromagnetic energy. For example, the wavelength of the electromagnetic energy may be a part of the visible light spectrum (e.g., visible light laser such as blue laser and/or the like). The transparent portions of the enclosure, such as the lid and/or the sidewall, may be formed from one or more materials capable of filtering out a first wavelength of the electromagnetic energy while transmitting a second wavelength of the visible spectrum. These constraints may limit the visual appearance of the lid to colors that exclude the wavelengths of the electromagnetic energy generated by the computer numerically controlled machine. For instance, in one use case where the computer numerically controlled machine outputs blue-wavelength electromagnetic energy (e.g., blue laser having a wavelength of ~400-480 nanometers), the transparent portions of the enclosure for may be formed from a material that filters out blue wavelengths but transmits one or more combinations of red wavelengths, orange wavelengths, yellow wavelengths, and green wavelengths. Such an enclosure may contain the blue-wavelength electromagnetic energy while still providing visibility into the interior space of the computer numerically controlled machine.

The visual appearance of the enclosure, particularly the transparent portion of the enclosure, may be determined by the lighting conditions inside and around the computer numerically controlled machine. For example, light may be transmitted from the interior space of the computer numerically controlled machine. This internal light may originate from a variety of sources including, for example, light associated with the electromagnetic energy, interior lighting, and reflections of such light. Light present in the ambient environment of the computer numerically controlled machine may also reflect off the surface of the enclosure. The light that reflects off the surface of the enclosure may include sunlight, room light, moonlight, or no light at all. The interior light that is transmitted through the transparent portion of the enclosure, when combined with the light that is reflected off the surface of the enclosure, may contribute to the visual appearance of the enclosure, including the color of the transparent portion of the enclosure. The visual appearance of the enclosure (e.g., the color of the transparent portion of the enclosure) may be further affected by the ambient light transmitted through the transparent portion of the enclosure before being reflected back through the transparent portion of the enclosure.

The optical properties of the transparent portion of the enclosure, including its response to the lighting conditions inside and around the computer numerically controlled machine, may in fact limit variations in the visual appearance of the enclosure, including the color of the transparent portion of the enclosure. Returning to the previous example, in order for the transparent portion of the enclosure to filter out blue-wavelength electromagnetic energy (e.g., blue laser having a wavelength of ~400-480 nanometers), the transparent portion of the enclosure can neither be fully transparent (e.g., capable of transmitting all colors in the visible spectrum) nor transmit colors that include blue wavelengths in the RGB color space (e.g., orange or other colors around the wavelength ~500-650 nanometers). The visual appearance of the enclosure, including the color of the transparent portion of the enclosure, may be limited by the selection of materials that are capable of filtering out blue-wavelength electromagnetic energy. These materials are typically yellow or orange and may include certain combinations of green and red, but this selection of colors may nevertheless fail to conform to the desired visual appearance of the enclosure, which may be necessary to maintain uniformity in brand aesthetics and to differentiate from competitor products.

In some implementations of the current subject matter, to enable a greater variation in the visual appearance of the enclosure, including the color of the transparent portion of the enclosure, multiple layers of materials with different optical properties may be used to form the transparent portion of the enclosure. For example, the transparent portion of the enclosure may include at least a first layer of a first material configured to filter a first range of wavelengths associated with the electromagnetic energy generated by the computer numerically controlled machine. As such, the first layer of the first material may attenuate or prevent light having the first range of wavelengths associated with the electromagnetic energy generated by the computer numerically controlled machine from passing through the transparent portion of the enclosure. Meanwhile, light having wavelengths that are not within the first range of wavelengths is still able to pass through the transparent portion of the enclosure. Furthermore, the transparent portion of the enclosure may also include a second layer of a second material configured to reflect a second range of wavelengths. The internal light transmitted through the first layer of the first material and the second layer of the second material, when combined with ambient light reflected off the surface of the second layer of the second material, may achieve the desired appearance of the enclosure, including a desired color of the transparent portion of the enclosure.

The inclusion of one or more additional layers of material that transmits different wavelengths of light than the layer of material filtering the wavelengths associated with the electromagnetic energy may allow for greater variations in the visual appearance of the enclosure. That is, the transparent portion of the enclosure may be a different color than the color required for filtering the wavelengths of the electromagnetic energy. For example, if the computer numerically controlled machine generates blue-wavelength electromagnetic energy, a yellow or orange colored material is typically used to attenuate the transmission of the blue-wavelength electromagnetic energy through the transparent portion of the enclosure. However, instead of a single layer of an orange or yellow colored material, the transparent portion of the enclosure may include additional layers of materials in a different color that, in combination with orange or yellow colored layer, lends a desired color to the transparent portion of the enclosure.

In some implementations of the current subject matter, variations in the visual appearance of the enclosure, including the color of the transparent portion of the enclosure, may be further maximized by mechanisms to adjust the optical properties of the transparent portion of the enclosure based on changes in lighting conditions. For example, the computer numerically controlled machine may include one or more sensors, system-level detectors, and/or controls configured to trigger changes in the optical properties of the enclosure. When the computer numerically controlled machine is generating electromagnetic energy, for example, the transparent portion of the enclosure may be transitioned to having a first optical property (e.g., a darkening or a change in color) and the transparent portion of the enclosure may be transitioned to having a second optical property while the computer numerically controlled machine is in a dormant or low energy operating mode.

In some implementations of the current subject matter, the safety and reliability of the enclosure, which may be at least partially transparent, may be ensured by monitoring the light that is transmitted through the transparent portion of the enclosure and modulating the operations of the computer numerically controlled machine accordingly. In the previous example, if blue-wavelength light is detected outside of the enclosure (e.g., using sensors placed on or around the transparent portion of the enclosure), the source of the electromagnetic energy may be disabled, the computer numerically controlled machine may be powered off, and/or an alarm (e.g., an audio alarm, a visual alarm, a haptic alarm, and/or the like) may be generated.

In some implementations of the current subject matter, the visual appearance of the enclosure may instead include an opaque enclosure without a transparent portion for viewing the workspace inside the enclosure. Such a design may be selected, for example, to reduce cost and/or provide a visual appearance that has a desired aesthetic visual effect. In some examples, a camera internal to the computer-numerically-controlled machine may capture images that can be displayed for a user to view the workspace internal to the computer-numerically-controlled machine without requiring a transparent portion of the enclosure.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a computer numerically controlled machine modifies the appearance of the material without fully penetrating it. For example, in the context of a laser cutter, it can mean removing some of the material from the surface and/or discoloring the material (e.g., through an application of focused electromagnetic energy delivering electromagnetic energy as described below).

As used herein, the term "laser" includes any electromagnetic energy or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared energy far from the visible spectrum such as microwaves, X-rays, or gamma rays, optically filtered detectors, spectrometers, and other detectors that can include sources providing electromagnetic energy for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the computer numerically controlled machine. For example, if the computer numerically controlled machine is a laser cutter, the material is what is placed in the computer numerically controlled machine to be cut, for example, the raw materials, stock, or the like. The computer numerically controlled (CNC) machine may be a machine that is used to perform subtractive processing (e.g., by removing the material) under the control of a computer, in which case the computer numerically controlled machine may include one or more motors (or other actuators) that move one or more heads performing the removal of the material.

Figure 1B:
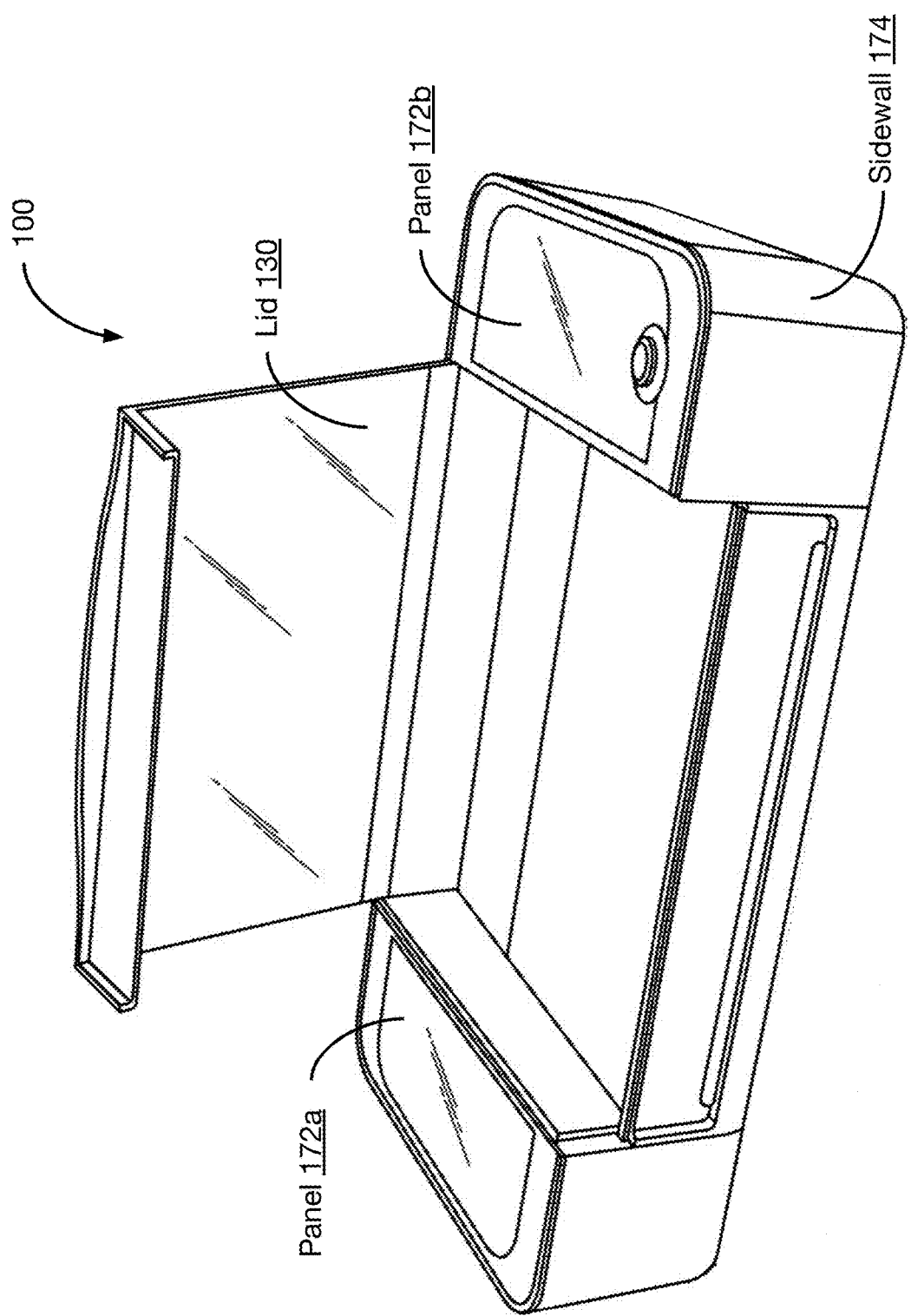
FIG. 1B depicts another perspective view of an example of a computer numerically controlled machine consistent with some implementations of the current subject matter.

FIGS. 1A-B depict perspective views of an example of a computer numerically controlled machine, consistent with implementations of the current subject matter. An elevational view of an example of the computer numerically controlled machine 100 shown in FIG. 2A. The example of the computer numerically controlled machine 100 shown in FIG. 2A may include a camera 110 positioned to capture an image of an entire material bed 150 and another camera 120 positioned to capture an image of a portion of the material bed 150, consistent with some implementations of the current subject matter. FIG. 2B depicts a top view of the example of the computer numerically controlled machine 100 shown in FIGS. 1A-B and 2A.

In some implementations of the current subject matter, the computer numerically controlled machine 100 may be a laser cutter/engraver that uses electromagnetic energy (e.g., laser) to perform various forms of subtractive processing including, for example, cutting, engraving, and/or the like. While some features are described herein in the context of a laser cutter, this is by no means intended to be limiting. Many of the features described below can be implemented with other types of computer numerically controlled machines.

As a laser cutter/engraver, the computer numerically controlled machine 100 may be subject to particularly challenging design constraints. For example, a laser cutter/engraver is subject to regulatory guidelines that restrict the egress of electromagnetic energy from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself.

Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as, for example, smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object.

Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being effected, and air or other gasses may be used to aid the cutting process in a different manner, by facilitating combustion or clearing debris, for example.

Referring again to FIG. 2A, the computer numerically controlled machine 100 can have an enclosure (or housing) defining an interior space of the computer numerically controlled machine 100. The enclosure can include walls, a bottom, and one or more openings to allow access to the computer numerically controlled machine 100. In addition, the material bed 150 may be disposed at least partially within the enclosure of the computer numerically controlled machine 100 and may include a top surface on which the material 140 generally rests.

Figure 2A:
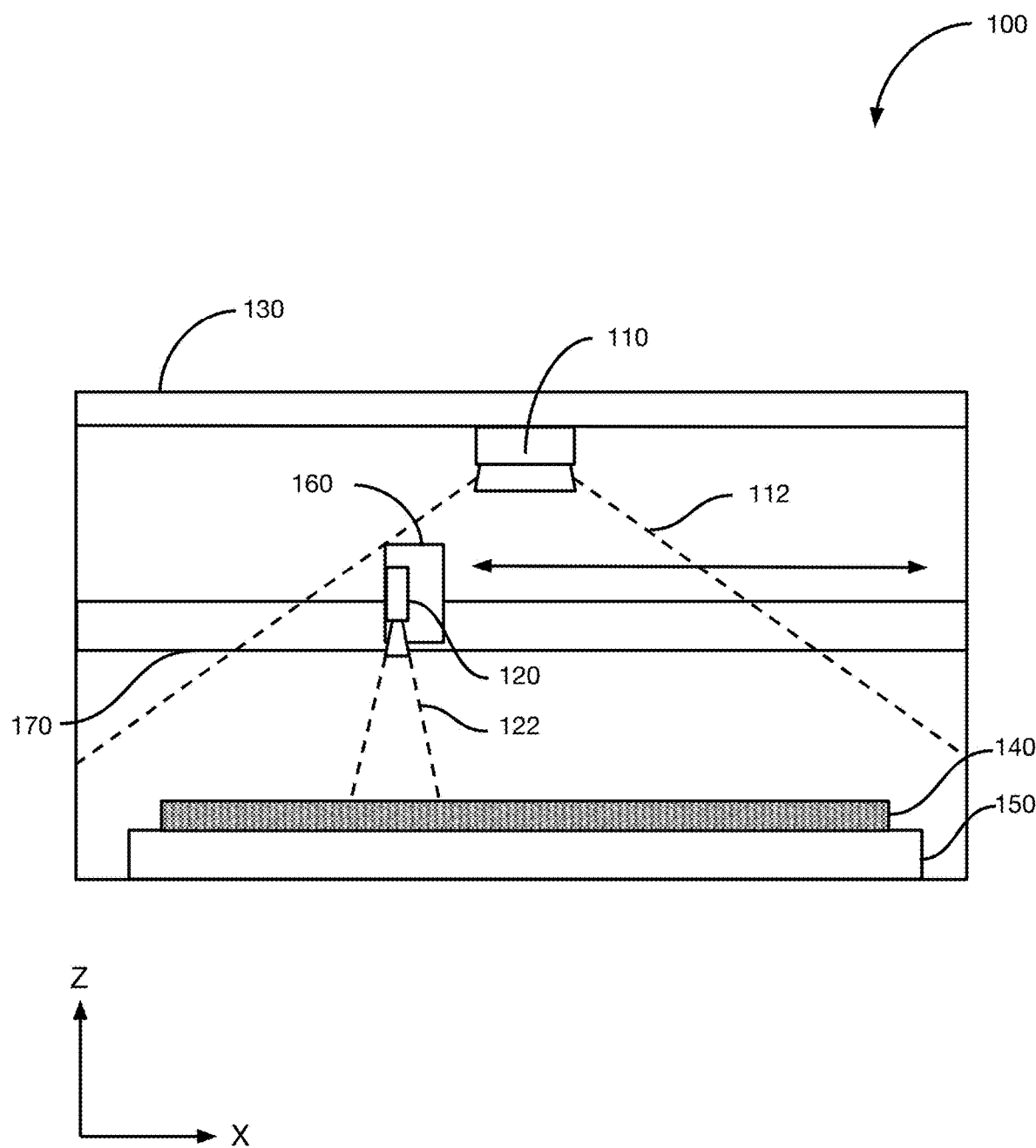
FIG. 2A depicts an elevational view of an example of a computer numerically controlled machine consistent with some implementations of the current subject matter.
Figure 2B:
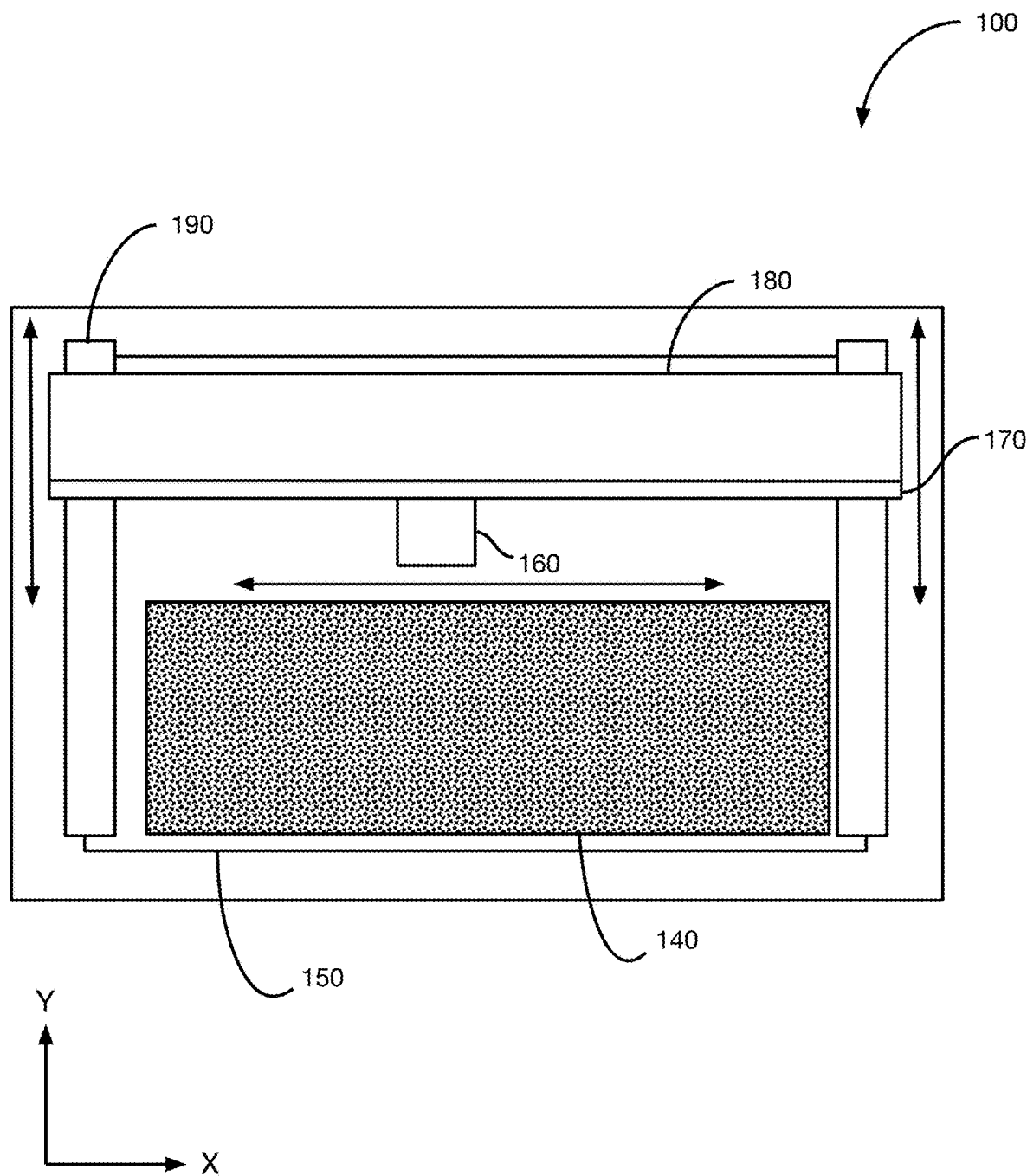
FIG. 2B depicts a top view of an example of a computer numerically controlled machine consistent with implementations of the current subject matter.

In the example of the computer numerically controlled machine 100 shown in FIG. 2A, the computer numerically controlled machine 100 can also include an openable barrier as part of the enclosure to allow access between an exterior of the computer numerically controlled machine 100 and an interior space of the computer numerically controlled machine 100. The openable barrier can include, for example, one or more doors, hatches, flaps, lids, and the like that can actuate between an open position and a closed position. FIGS. 1A-B depict one example of an openable barrier, which is a lid 130 that can be opened (as shown in FIG. 1B) to provide access to material 140 inside the enclosure. When in a closed position as shown in FIG. 1A, the lid 130 may be configured to attenuate the transmission of electromagnetic energy between the interior space and the exterior including by filtering out wavelengths associated with the electromagnetic energy generated by the computer numerically controlled machine 100.

In some examples, the lid 130 can be a transparent portion of the housing and may thus be capable of transmitting at least some wavelengths of light while being impermeable to the wavelengths associated with the electromagnetic energy generated by the computer numerically controlled machine 100. In the example shown in FIGS. 1A-B, additional portions of the enclosure of the computer numerically controlled machine 100 may be transparent such as a first panel 172a and a second panel 172b adjacent to the lid 130. The optical properties of the materials forming the lid 130 (and other transparent portions of the enclosure such as, for example, the first panel 172a and the second panel 172b) may be such that the lid 130 exhibits a desired color under various lighting conditions while being transparent but impermeable to the wavelengths of the electromagnetic energy generated by the computer numerically controlled machine 100. Contrastingly, some portions of the enclosure, such as the sidewall 174 shown in FIGS. 1A-B, may be formed from an opaque material that is impermeable to wavelengths of light in the visible spectrum.

Various example implementations discussed herein include reference to the lid 130. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the computer numerically controlled machine 100. These access points can be for access to power, air, water, data, etc. Any of these access points can be monitored by cameras, position sensors, switches, etc. If they are accessed unexpectedly, the computer numerically controlled machine 100 can execute actions to maintain the safety of the user and the system, for example, a controlled shutdown. In other implementations, the computer numerically controlled machine 100 can be completely open (i.e., not having a lid 130, or walls). Any of the features described herein can also be present in an open configuration, where applicable.

The computer numerically controlled machine 100 can have one or more heads including, for example, the head 160, which can be operated to alter the material 140. The head 160 may be configured to steer a beam of electromagnetic energy to a desired location on the material 140 positioned in the working area of the computer numerically controlled machine 100. For instance, the head 160 may be mobile including by translating and/or rotating to locate a beam of electromagnetic energy from a source configured to generate and/or emit the electromagnetic energy. Alternatively, the head 160 may be stationary and the beam of electromagnetic energy may be located by translating and/or rotating one or more optical components configured to route the electromagnetic energy from the head 160. It should be appreciated that the computer numerically controlled machine 100 may include multiple heads that operate independently or in unison to locate the beam of electromagnetic energy.

In some implementations of the current subject matter, the head 160 can be configured to include a combination of optical, electronic, and/or mechanical components that can, in response to commands, cause a laser beam or electromagnetic energy to be delivered to cut or engrave the material 140. For example, the head 160 may be configured to deliver a visible laser (e.g., a laser having wavelengths in the visible spectrum) produced by a diode, a gas laser source, a fiber laser source, and/or the like. The source (e.g., an emitter and/or the like) generating the electromagnetic energy may be part of the head 160 or separate from the head 160. The computer numerically controlled machine 100 can also execute operation of a motion plan for causing movement of the head 160 in implementations where the head 160 is configured to be mobile.

Electromagnetic energy effecting one or more changes in the material 140 that is at least partially contained within the interior space of the computer numerically controlled machine 100 may therefore be delivered by moving the head 160. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head 160 can be linear, for example on an x-axis, a y-axis, or a z-axis. In other implementations, the head 160 can combine motions along any combination of directions in a rectilinear, cylindrical, or spherical coordinate system.

A working area for the computer numerically controlled machine 100 can be defined by the limits within which the head 160, whether stationary or mobile, can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the computer numerically controlled machine, that 400 in³ volume can be considered to be the working area.

The working area can be defined by the extents of positions in which material 140 can be worked by the computer numerically controlled machine 100. As such, the boundaries of the working area may not necessarily be defined or limited by the range of travel of any one component. For example, if the head 160 could turn at an angle, then the working area could extend in some direction beyond the travel of the head 160. By this definition, the working area can also include any surface, or portion thereof, of any material 140 placed in the computer numerically controlled machine 100 that is at least partially within the working area, if that surface can be worked by the computer numerically controlled machine 100. Similarly, for oversized material, which may extend even outside the computer numerically controlled machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the computer numerically controlled machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the computer numerically controlled machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent (or enable) some or all functions of the computer numerically controlled machine 100 while an openable barrier, for example, the lid 130, is in the open state (e.g., not in a closed state). The reverse can be true as well, meaning that some functions of the computer numerically controlled machine 100 can be prevented (or enabled) while in a closed state. There can also be interlocks in series where, for example, the computer numerically controlled machine 100 will not operate unless both the lid 130 and the front door are both closed. In some examples, the detection of a change in state of the interlock (e.g., the interlock moving from an open to a closed state or vice-versa) may trigger certain operations within the computer numerically controlled machine. For example, upon detection that the interlock is moving from an open state to a closed state, a procedure (e.g., calibration procedure, material edge detection procedure, etc.) of the computer numerically controlled machine may be initiated. Furthermore, some components of the computer numerically controlled machine 100 can be tied to states of other components of the computer numerically controlled machine, such as not allowing the lid 130 to open while the laser is on, a movable component moving, a motor running, sensors detecting a certain gas, and/or the like. The interlock can prevent emission of electromagnetic energy from the head 160 when detecting that the lid 130 is not in the closed position.

One or more cameras can be mounted inside the computer numerically controlled machine 100 to acquire image data during operation of the computer numerically controlled machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a .JPG file, and data resulting from the analysis of image data processed on the camera unit such as direction and velocity from an optical mouse sensor. For example, there can be one or more cameras mounted such that they gather image data (also referred to as 'view' or 'image') from an interior portion of the computer numerically controlled machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the computer numerically controlled machine 100 is in a closed position. In particular, in some preferred embodiments, the one or more cameras can image the material 140 while the computer numerically controlled machine 100 is closed and, for example, while machining the material 140. In some implementations, one or more cameras can be mounted within the interior space and opposite the working area. In other implementations, there can be one or more cameras attached to the lid 130. One or more cameras can also be capable of motion such as translation to a plurality of positions, rotation, and/or tilting along one or more axes. One or more cameras mounted to a translatable support, such as a gantry 180, which can be any mechanical system that can be commanded to move (movement being understood to include rotation) the one or more cameras or a mechanism such as a mirror that can redirect the view of the one or more cameras, to different locations and view different regions of the computer numerically controlled machine. The head 160 is a special case of the translatable support, where the head 160 is limited by the track 190 and the translation rail 170 that constrain its motion.

Lenses can be chosen for wide angle coverage, for extreme depth of field so that both near and far objects may be in focus, or many other considerations. The one or more cameras may be placed to additionally capture the user so as to document the building process, or placed in a location where the user can move the camera, for example on the underside of the lid 130 where opening the computer numerically controlled machine 100 causes the camera to point at the user. Here, for example, the single camera described above can take an image when the lid is not in the closed position. Such an image can include an object, such as a user, that is outside the computer numerically controlled machine 100. One or more cameras can be mounted on movable locations like the head 160 or lid 130 with the intention of using video or multiple still images taken while the one or more cameras are moving to assemble a larger image, for example scanning the one or more cameras across the material 140 to get an image of the material 140 in its totality so that the analysis of image data may span more than one image.

As shown in FIG. 2A, a lid camera 110, or multiple lid cameras, can be mounted to the lid 130. In particular, as shown in FIG. 2A, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 2A, a head camera 120, or multiple head cameras, can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the computer numerically controlled machine 100 to view users or view external features of the computer numerically controlled machine 100.

Multiple cameras can also work in concert to provide a view of an object or material 140 from multiple locations, angles, resolutions, etc. For example, the lid camera 110 can identify the approximate location of a feature in the computer numerically controlled machine 100. The computer numerically controlled machine 100 can then instruct the head 160 to move to that location so that the head camera 120 can image the feature in more detail.

While the examples herein are primarily drawn to a laser cutter, the use of the cameras for machine vision in this application is not limited to only that specific type of computer numerically controlled machine 100. For example, if the computer numerically controlled machine 100 were a lathe, the lid camera 110 can be mounted nearby to view the rotating material 140 and the head 160, and the head camera 120 located near the cutting tool. Similarly, if the computer numerically controlled machine 100 were a 3D printer, the head camera 120 can be mounted on the head 160 that deposits material 140 for forming the desired piece.

An image recognition program can identify conditions in the interior portion of the computer numerically controlled machine 100 from the acquired image data. The conditions that can be identified are described at length below, but can include positions and properties of the material 140, the positions of components of the computer numerically controlled machine 100, errors in operation, etc. Based in part on the acquired image data, instructions for the computer numerically controlled machine 100 can be created or updated. The instructions can, for example, act to counteract or mitigate an undesirable condition identified from the image data. The instructions can include changing the output of the head 160. For example, where the computer numerically controlled machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 180. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The computer numerically controlled machine 100 can execute the instructions to create the motion plan or otherwise effect the changes described above. In some implementations, the movable component can be the gantry 180, the head 160, and/or the like. An identifiable mark may be disposed on the moveable component to facilitate tracking changes in the position of the moveable component. The movable component, for example the gantry 180, can have a fixed spatial relationship to the head 160. The image data can update software controlling operation of the computer numerically controlled machine 100 with a position of the head 160 and/or the gantry 180 with their position and/or any higher order derivative thereof.

Because the type of image data required can vary, and/or because of possible limitations as to the field of view of any individual camera, multiple cameras can be placed throughout the computer numerically controlled machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. Alternatively and/or additionally, images produced by multiple cameras can be used for stereovision, which is a process that includes comparing features found in two or more images to determine the distance between the cameras and the feature. Stereovision may be one example of a technique used to determine the height (or thickness) of the material 140 at various locations across the material 140. The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods.

Figure 3:
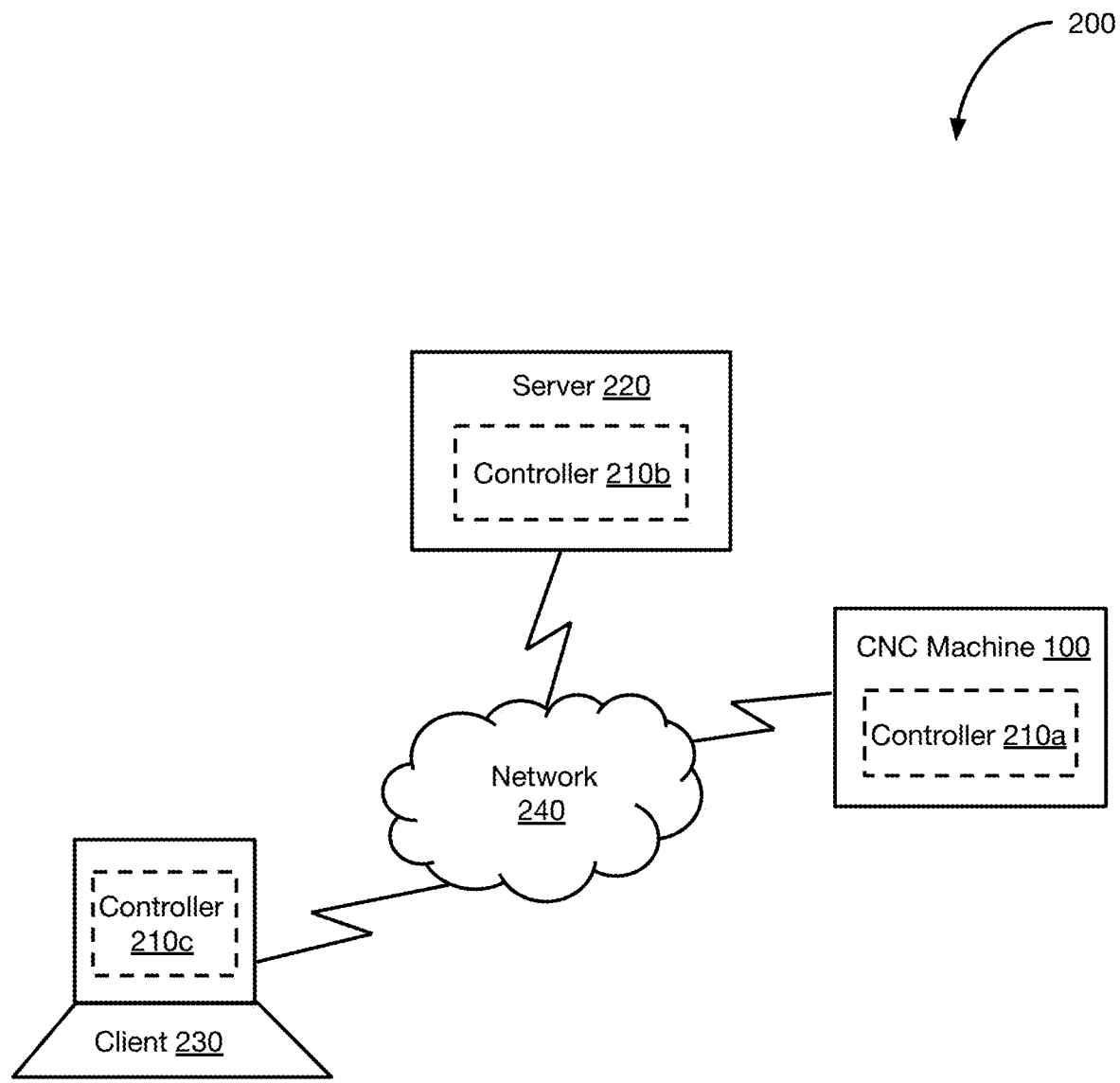
FIG. 3 depicts a system diagram illustrating an example of a computer numerically controlled processing system consistent with implementations of the current subject matter.

In some implementations of the current subject matter, the computer numerically controlled machine 100 may be part of a computer numerically controlled processing system. To further illustrate, FIG. 3 depicts a block diagram illustrating an example of a computer numerically controlled processing system 200 consistent with implementations of the current subject matter. As shown in FIG. 3, the computer numerically controlled processing system 200 may include the computer numerically controlled machine 100 and a controller 210 configured to control the operations of the computer numerically controlled machine 100. Moreover, as shown in FIG. 3, the controller 210 may be deployed at one or more locations. For example, as shown in FIG. 3, a first controller 210*a* may be deployed at the computer numerically controlled machine 100. Alternatively and/or additionally, a second controller 210*b* may be deployed at a server device 220 and/or a third controller 210*c* may be deployed at the client device 230. The server device 220 and the client device 230 may be communicatively coupled with the computer numerically controlled machine 100.

Accordingly, one or more functionalities of the controller 210, including those associated with adjusting the optical characteristics of the lid 130 (or other transparent portions of the housing), may be performed at the computer numerically controlled machine 100, the server device 220, and/or the client device 230. Whether performed at the computer numerically controlled machine 100, the server device 220, and/or the client device 230, it should be appreciated that the optical characteristics of the lid 130 (and/or other transparent portions of the housing) may be adjusted as part of a fabrication or fabrication process in which the computer numerically controlled machine 100 processes, for example, the material 140 to achieve one or more designs. The optical characteristics of the lid 130 (and/or other transparent portions of the housing) may also be adjusted while the computer numerically controlled machine 100 is powered on but not actively processing the material 140.

As shown in FIG. 3, the computer numerically controlled machine 100 may be communicatively coupled with the server device 220 and/or the client device 230 via a network 240. Moreover, the client device 230 and the server device 220 may also be communicatively coupled via the network 240. The network 240 may be a wired network and/or a wireless network including, for example, a local area network (LAN), a virtual local area network (VLAN), a wide area network (WAN), a public land mobile network (PLMN), the Internet, and/or the like. The client device 230 and the server device 220 may be one or more processor-based computing devices such as, for example, a smartphone, a tablet computer, a laptop computer, a desktop computer, a workstation, a wearable apparatus, an Internet-of-Things (IoT) appliance, and/or the like. The client device 230 and the server device 220 may include computer software and hardware configured to provide one or more functionalities of the controller 210 such that the functionalities of the controller 210 are accessible, via the network 240, to the computer numerically controlled machine 100.

Figure 4A:
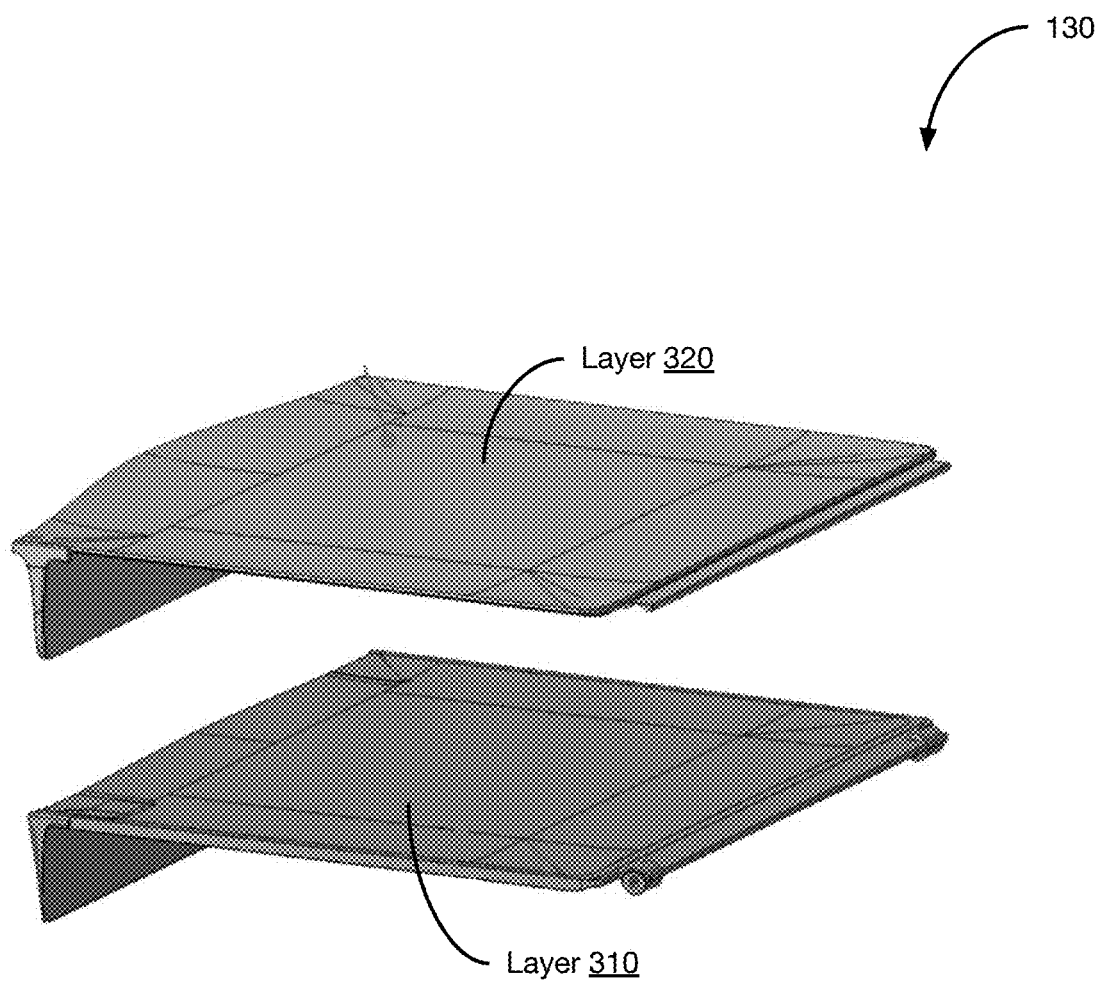
FIG. 4A depicts an exploded view of an example of a transparent portion of a computer numerically controlled machine consistent with implementations of the current subject matter.

In some implementations of the current subject matter, the lid 130 may be formed from multiple layers of materials having different optical properties such that the lid 130 is transparent and capable of attenuating the electromagnetic energy generated by the computer numerically controlled machine 100 while still exhibiting a desired visual appearance, such as a color that is consistent with brand aesthetics and/or differentiable from competitor products. FIG. 4A depicts an example of the lid 130 having a first layer 310 and a second layer 320. The first layer 310 may be formed from a first material capable of filtering a first range of wavelengths associated the electromagnetic energy generated by the computer numerically controlled machine 100 whereas the second layer 320 may be formed from a second material capable of transmitting second range of wavelengths. The first layer 310 and the second layer 320 may be configured to exhibit certain optical properties such that internal light from the interior space of the computer numerically controlled machine 100, when transmitted through the first layer 310 of the first material and the second layer 320 of the second material and combined with ambient light reflected off the surface of the second layer 320 of the second material, may achieve the desired appearance of the lid 130.

In some implementations of the current subject matter, the optical properties of the first layer 310 and the second layer 320 may be dependent upon various characteristics of the first layer 310 and the second layer 320 including, for example, thickness, color, and/or the like. For example, the color of the lid 130 may be achieved by combining the first color of the first layer 310 and the second color of the second layer 320 in a ratio that corresponds to a first thickness of the first layer 310 and the second thickness of the second layer 320. Moreover, the color of the lid 130 may not be limited to those complementary to the color of the electromagnetic energy output by the computer numerically controlled machine 100 and thus capable of filtering out the wavelengths of the electromagnetic energy generated by the computer numerically controlled machine 100. For instance, while the first layer 310 may be in a first color that is complementary to the color of the electromagnetic energy generated by the computer numerically controlled machine 100, the second layer 320 may be in a second color. The second layer 320 may disguise the first layer 310 to achieve the desired visual appearance of the computer numerically controlled machine 100. Alternatively and/or additionally, the second color of the second layer 320 may combine with the first color of the first layer 310 to achieve the desired visual appearance of the computer numerically controlled machine 100.

In the event the computer numerically controlled machine 100 generates electromagnetic energy having blue wavelengths (e.g., blue laser), for example, the first layer 310 may be a 2-millimeter thick layer of an orange-colored material capable of filtering out blue wavelengths while the second layer 320 may be in a different color than the oranges and yellows typically associated with the materials capable of capable of filtering out blue wavelengths. For instance, the second layer 320 may be a 2-millimeter thick layer of a blue colored material that disguises the orange color of the first layer 310 to achieve the desired visual appearance of the computer numerically controlled machine 100.

The choice of the first material forming the first layer 310 and the second material forming the second layer 320 may be determined based at least on the optical properties of the first material (e.g., how the first material attenuates light) and how the first material interacts with the second material. The choice of the first material forming the first layer 310 and the second material forming the second layer 320 may also be informed by the color perception of the user including color metamerism in which the user perceives substantially the same color despite being exposed to different combinations of light across all wavelengths.

The perceived color of the lid 130 may be change when light is merely reflecting off of the second layer 320 of the second material and when internal light from the interior space of the computer numerically controlled machine 100 is being transmitted through the first layer 310 of the first material and the second layer 320 of the second material. As will be discussed in further details, adjustments may be made to the optical properties of the lid 130 and/or the internal lighting of the computer numerically controlled machine 100 in order to achieve and/or maintain a consistent visual appearance of the lid 130 (and/or other transparent portions of the computer numerically controlled machine 100). Doing so may generate a first combination of light that is perceived as a same color as a second combination of light that is present when no internal light is being transmitted through the lid 130. Alternatively, in some cases, the optical properties of the lid 130 and/or the internal lighting of the computer numerically controlled machine 100 may be adjusted in order to reflect a corresponding change in the operating mode of the computer numerically controlled machine 100.

In some implementations of the current subject matter, the lid 130 having the desired visual appearance may be formed using a variety of techniques including injection molding, insert molding, cover colorization, and/or the like. With multi-injection molding, such as dual or two-shot injection molding, the first layer 310 and the second layer 320 may be rendered in a variety of transparent materials (or combination of materials) including, for example, resin, polycarbonate, and/or the like. Moreover, the first layer 310 may be a first material having a first color while the second layer 320 may be a second material having a second color that is disposed on top of the first layer 310 to disguise the first color of the first material forming the first layer 310. It should be appreciated that the injection molding process may be configured to accommodate various different properties of the first material of the first layer 310 and the second material of the second layer 320. For instance, in order for the second layer 320 to be more scratch resistant than the first layer 310, the injection molding process may accommodate a difference in melting temperatures between the first material of the first layer 310 and the second material of the second layer 320.

Figure 4B:
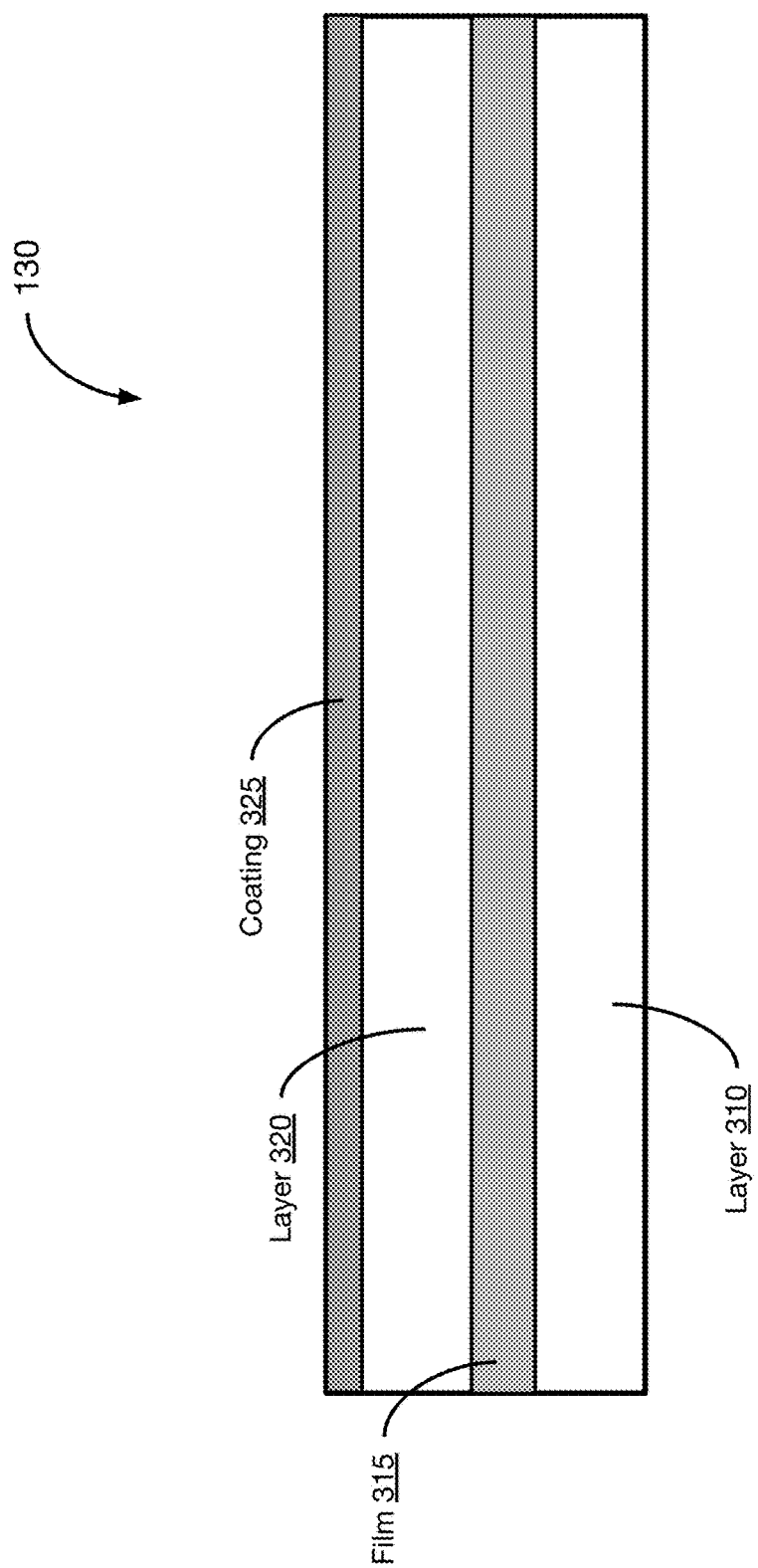
FIG. 4B depicts a schematic diagram illustrating another example of a transparent portion of a computer numerically controlled machine consistent with implementations of the current subject matter.

In the example of the lid 130 shown in FIG. 4B, a coating 325 may be disposed on a surface of the second layer 320 to further adjust the visual appearance of the lid 130. In one example, the coating 325 may be a transparent coating in a different color than the first material forming the first layer 310 and/or the second material forming the second layer 320. Alternatively and/or additionally, the coating 325 may be a metalized coating or multiple layers of optical coatings built up on top of one another to achieve a desired visual appearance. In some cases, the coating 325 may be configured to exhibit various anti-reflective properties such as thin-film interference (e.g., producing different reflectance from different angles), iridescence, and/or the like. The coating 325 may also be a polymer dispersed liquid crystal (PDLC) film whose refractive properties change upon application of a low voltage, for example, to reduce the permeability of the lid 130 to light. Additional treatments, such as polishing and/or texturization, may also be applied to the surface of the second layer 320 and/or the coating 325 in order to achieve the desired visual appearance of the lid 130.

Another technique for forming the lid 130 may be insert molding in which a film 315 is interposed between the first layer 310 and the second layer 320, as shown in FIG. 4B. The film 315 may be a thin, semi-transparent, and reflective metallic film that isolates the first layer 310 from contributing to the visual appearance (e.g., color) of the lid 130 when no light is being emitted from the interior space of the computer numerically controlled machine 100, such as when the computer numerically controlled machine 100 is powered off. The effect is to allow the second layer 320 of the lid 130 to dominate the visual appearance of the lid 130. Disposing the film 315 between the first layer 310 and the second layer 320 may require minimizing the bend radii of the film 315, securing the film 315 during the injection molding process to prevent distortions, and selecting the film 315 to have a higher melt temperature than the materials forming the first layer 310 and the second layer 320 such that the film 315 does not degrade during molding.

Figure 4C:
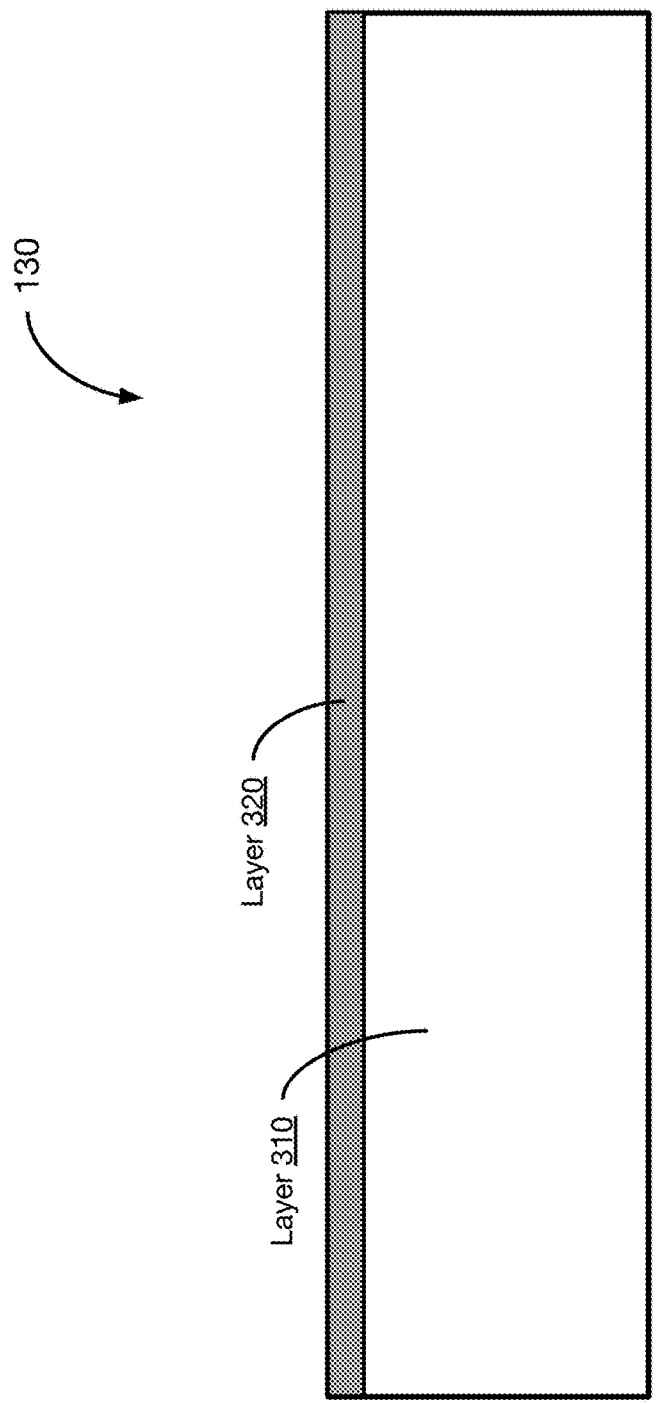
FIG. 4C depicts a schematic diagram illustrating another example of a transparent portion of a computer numerically controlled machine consistent with implementations of the current subject matter.

Referring to FIG. 4C, cover colorization may be another technique for forming the lid 130 in which the second layer 320 is a coating that is applied to the surface of the first layer 310 to form the lid 130. In the previous example in which the lid 130 is configured to filter out blue-wavelength electromagnetic energy, the first layer 310 may be, for example, a 4-millimeter thick layer of an orange-colored material capable of filtering out blue wavelengths while the second layer 320 is a coating that is applied to the surface of the first layer 310 to make the first layer 310 not appear orange to the eye. The second layer 320 in this case may be a thin film of metal that is semi-transparent and reflective of the ambient light around the computer numerically controlled machine 100. It should be appreciated that the second layer 320 may be applied in a variety of manner including, for example, vacuum metalization, vapor deposition, sputter coating, adhesives, painting, tinting (e.g., a hardened topcoat layer), and/or the like.

Figure 4D:
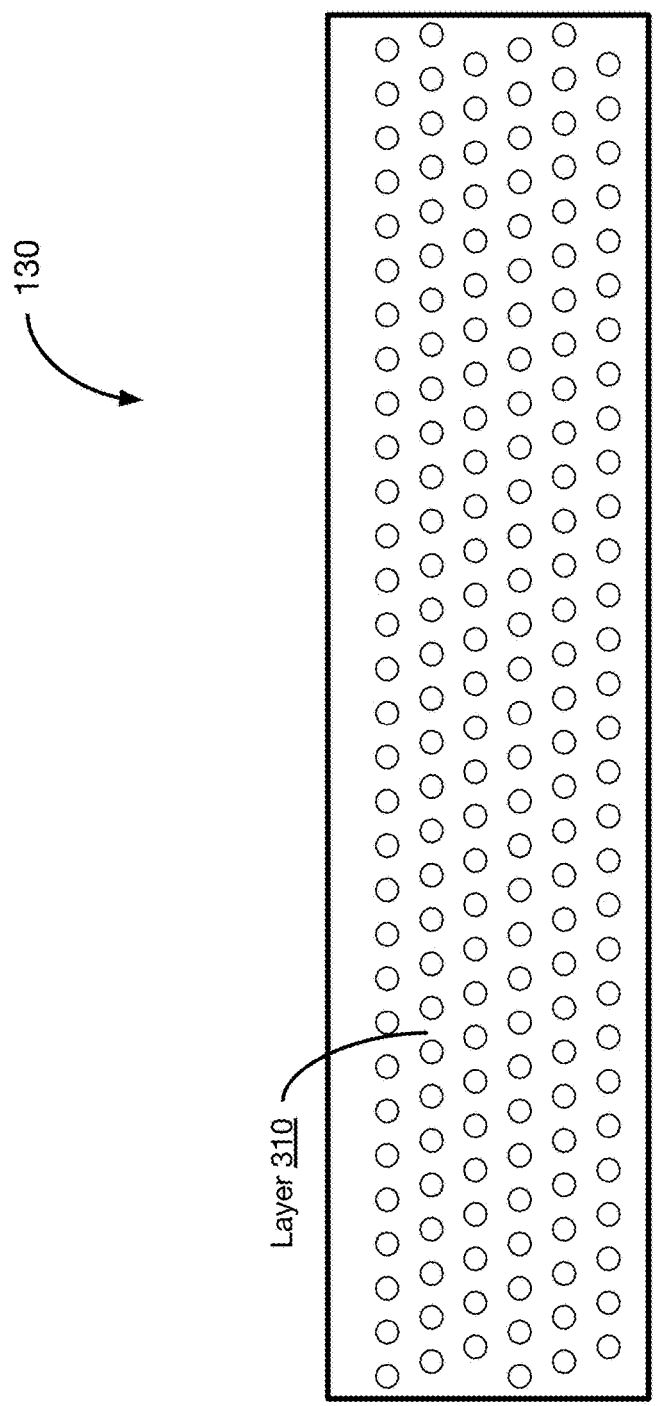
FIG. 4D depicts a schematic diagram illustrating another example of a transparent portion of a computer numerically controlled machine consistent with implementations of the current subject matter.

FIG. 4D depicts a schematic diagram illustrating another example of the lid 130 consistent with implementations of the current subject matter. In the example of the lid 130 shown in FIG. 4D, the first layer 310 of the lid 130 may be formed from a transparent material in which particles of another material are dispersed throughout. For example, the first layer 310 of the lid 130 may include glass particles, which are dispersed throughout a transparent material such as glass, resin, polycarbonate, and/or the like. The particles may be similar in size and distributed throughout the transparent material in a random, pseudo-random, and/or regular order. Moreover, in order for the lid 130 to diffuse the electromagnetic energy generated by the computer numerically controlled machine 100, the dimensions of the particles (or the mean dimensions of the particles) may be smaller than the wavelength of the electromagnetic energy and be formed from a material having a different index of refraction than the material in which the particles are dispersed. Thus, in order for the lid 130 to diffuse light having a wavelength of 450 nanometers, the particles should be less than 450 nanometers in size.

It should be appreciated that the magnitude of the diffusion achieved by the particles may be directly proportional to the difference between a first index of refraction of a first material forming the particles and a second index of refraction of a second material in which the particles are dispersed. Moreover, the transparency of the lid 130 may be reduced when the density of the particles is high. Thus, a lower quantity of particles may be dispersed in order to increase the transparency of the lid 130. As described in more detail below, fewer particles may be dispersed if the particles are configured to diffuse as well as absorb the wavelengths associated with the electromagnetic energy generated by the computer numerically controlled machine 100.

In some example embodiments, in addition to diffusing the electromagnetic energy generated by the computer numerically controlled machine 100, the lid 130 may be configured to absorb the electromagnetic energy generated by the computer numerically controlled machine 100. In one example implementation, colored particles at the correct wavelength may be used to absorb the electromagnetic energy generated by the computer numerically controlled machine 100. For example, the particles may be spherical and orange colored, which allows the particles to diffuse as well as absorb blue-wavelength electromagnetic energy. The size of the particles may be sufficiently small to cause the blue-wavelength electromagnetic energy to diffuse through the lid 130 while their color may enable the particles to also absorb the blue-wavelength electromagnetic energy. Alternatively, the particles may be dispersed in another material (e.g., a dark grey colored material and/or the like) that is capable of absorbing the wavelengths of the electromagnetic energy generated by the computer numerically controlled machine 100. Because the total travel distance of light through the lid 130 is increased due to the diffusion caused to the particles, less of the color absorbing material (e.g., the dark grey colored material and/or the like) may be used in the lid 130, thus rendering the lid 130 more transparent in overall appearance.

In some implementations of the current subject matter, the lid 130 may be subjected to one or more edge treatments in order to maintain the desired visual appearance when the lid 130 is viewed from the side. As noted, the lid 130 may include at least the first layer 310 of the first material and the second layer 320 of the second material disposed on top of the first layer 310 of the first material. The edge treatments may be applied in order to disguise the interface between the first layer 310 and the second layer 320 that would otherwise be visible from the side edges of the lid 130. While providing cosmetic consistency, it should be appreciated that the edge treatments may also maintain the ability of the lid 130 to attenuate the wavelengths associated with the electromagnetic energy generated by the computer numerically controlled machine 100.

With injection molding, the edge treatments may include folding the second layer 320 over the first layer 310 without creating any crevices through which electromagnetic energy can potentially escape. To minimize the likelihood of stray electromagnetic energy escaping through the edges of the lid 130, the edges of the lid 130 may be rendered impermeable to electromagnetic energy by, for example, black paint. Alternatively and/or additionally, the edges of the lid 130 may be rendered internally reflective such that stray electromagnetic energy is redirected back towards the interior space of the computer numerically controlled machine 100. In some cases, light curtains and stretching may also be used to prevent the inadvertent escape of electromagnetic energy through the edges of the lid 130, especially in cases where two or more pieces of material meet and a potential gap exists.

In some implementations of the current subject matter, the selection of materials used to form the lid 130 (and/or other transparent portions of the housing of the computer numerically controlled machine 100) may be informed by the lighting conditions inside and around the computer numerically controlled machine 100. In particular, the lid 130 may be formed from materials that are capable of maintaining the desired visual appearance (e.g., color) when the computer numerically controlled machine 100 is an emissive mode where the computer numerically controlled machine 100 is powered on and interior illumination (e.g., light emitting diodes, electromagnetic energy and/or the like) is emitted through the lid 130, a reflective mode where the computer numerically controlled machine 100 is powered off and ambient light is reflected off the lid 130, and a combination mode in which the computer numerically controlled machine 100 is powered on, interior illumination is emitted through the lid 130, and ambient light is reflected off the lid 130.

In addition to selecting suitable materials for the lid 130, additional strategies may be employed to maintain the desired visual appearance of the computer numerically controlled machine 100 during the aforementioned different modes of operation. One example strategy may include adjusting the interior light that is emitted by the computer numerically controlled machine 100 including by adjusting the placement of the interior lighting, the colors of the interior lighting, or removing the interior lighting altogether. In some cases, different colors of interior lighting (e.g., the interior light emitting diode (LED) illumination) may be used to alter the perceived color of the light that is emitted through the lid 130 while the computer numerically controlled machine 100 is in the emissive mode and/or the combination mode. This may include using RGB light emitting diodes to create a white light during some operations such as image capture with the white light emulating a "camera flash." Alternatively and/or additionally, for a steady state illumination of the computer numerically controlled machine 100, a combination of RGB light emitting diodes may be used such that colors of the light emitting diodes may combine with the color of the electromagnetic energy to produce another color such as white.

Instead of and/or in addition to adjusting the interior light emitted by the computer numerically controlled machine 100, another example strategy to achieve and/or maintain the desired visual appearance may include adjusting the reflectivity of one or more interior surfaces of the computer numerically controlled machine 100. Doing so may alter the color of the light that is reflected off these interior surfaces and through the lid 130 (and/or other transparent portions of the housing of the computer numerically controlled machine 100). The reflectivity of the one or more interior surfaces may be adjusted by changing the color and/or texture of the materials forming these interior surfaces. Alternatively and/or additionally, the reflectivity of the one or more interior surfaces may be adjusted by changing the color and/or textures of the paint (or other coatings) covering these surfaces.

In some implementations of the current subject matter, the desired visual appearance of the computer numerically controlled machine 100 may also be achieved by dynamically adjusting the optical properties of the lid 130 and/or the interior lighting when the computer numerically controlled machine 100 is in different modes of operations such as, for example, during printing and not during printing, capturing an image of the interior space and not capturing an image of the interior space, and/or the like. For example, the controller 210 may respond to changes in the operating mode of the computer numerically controlled machine 100 and/or changes in ambient lighting by making corresponding adjustments to the optical properties of the lid 130 (e.g., by darkening or changing the color of the lid 130) and/or the interior lighting of the computer numerically controlled machine 100 such that the lid 130 (and/or other transparent portions of the computer numerically controlled machine 100) continues to exhibit a desired visual appearance (e.g., color). It should be appreciated that the darkening of the lid 130 may be achieved by the application of a polymer dispersed liquid crystal (PDLC) film as the coating 325 on the surface of the lid 130.

In one example use case, the desired visual appearance of the lid 130 may be a first color (e.g., turquoise) when the computer numerically controlled machine 100 is in a first mode of operation (e.g., powered off) and a second color (e.g., brown) when the computer numerically controlled machine 100 is in a second mode of operation (e.g., powered on with steady state illumination). The desired visual appearance of the computer numerically controlled machine 100, including each of the first color to the second color, may be achieved by subtracting the color of the first layer 310 of the lid 130 from the color white and promoting the intensity of the remaining colors. For example, the second layer 320 of the lid 130 may be configured to reflect light in the first color (e.g., turquoise). The controller 210 may respond to the computer numerically controlled machine 100 being in the second mode of operation by causing the internal lighting to be in a third color that yields the second color (e.g., brown) when combined with the colors of the first layer 310 and the second layer 320 of the lid 130.

In some implementations of the current subject matter, the computer numerically controlled machine 100 may include one or more sensors configured to detect the presence (or absence) of light within the interior space of the computer numerically controlled machine 100. An ability of these sensors to detect the presence of light may be maximized by the inclusion of a light scattering film, which may be applied to one or more surfaces within the interior space of the computer numerically controlled machine 100. One example of a light scattering film may include reflective particles (e.g., of Titanium (Ti) or another metal) in a colloid or in a very fine suspension such as plastic. The light scattering film may thus scatter an otherwise collimated beam of light throughout the interior space of the computer numerically controlled machine, thus maximizing a probability of the light being detected by a sensor regardless of its location within the interior space of the computer numerically controlled machine 100.

In some implementations of the current subject matter, the safety and reliability of the enclosure of the computer numerically controlled machine 100, which may include the transparent lid 130 (and/or other transparent portions), may be ensured by monitoring the light around the lid 130 (and/or other transparent portions) and modulating the operations of the computer numerically controlled machine 100 accordingly. For example, one or more sensors may be disposed on or proximate to the lid 130 to determine the wavelength of light received at an interior surface of the lid 130 and/or transmitted through the lid 130. It should be appreciated that this light may include ambient light around the computer numerically controlled machine 100, interior lighting within the enclosure of the computer numerically controlled machine 100, the electromagnetic energy generated by the computer numerically controlled machine 100, and/or the like. The controller 210, which may be communicatively coupled with the one or more sensors to receive the wavelength of light measured by the one or more sensors, may control the operations of the computer numerically controlled machine 100 based at least on the wavelength of light received at the interior surface of the lid 130 and/or transmitted through the lid 130. For instance, the controller 210 may reduce the power level of the electromagnetic energy generated by the computer numerically controlled machine 100 and/or power off the computer numerically controlled machine 100 upon detecting one or more wavelengths of light associated with the electromagnetic energy (e.g., wavelengths of 400-480 nanometers associated with blue laser) being received at the interior surface of the lid 130 and/or transmitted through the lid 130. In some cases, the sensors may perform a first measurement of the quantity of electromagnetic energy transmitted through the lid 130 when the computer numerically controlled machine 100 is not generating electromagnetic energy. The controller 210 may compare, to the first measurement, a second measurement of the quantity of electromagnetic energy transmitted through the lid 130 when the computer numerically controlled machine 100 is generating electromagnetic energy in order to determine whether electromagnetic energy, if any, is being transmitted through the lid 130.

The one or more sensors disposed on, or proximate to, the lid 130 discussed above may take various forms. For instance, the sensor(s) may include one or more cameras, consistent with the discussion above, that are configured to detect a given wavelength of light associated with electromagnetic energy. In some implementations, the source of the electromagnetic energy may include a pulse width modulation driver that may be used to encode a signature within the electromagnetic energy that may allow the one or more sensors to differentiate the electromagnetic energy (e.g., using a bandpass filter to identify signals of interest) from other light that may reach the one or more sensors (e.g., sunlight, other ambient light sources, etc.).

Further, the one or more sensors may be configured to detect a power level (e.g., amplitude) of the electromagnetic energy. Accordingly, if the sensors detect electromagnetic energy having the given wavelength that exceeds a given threshold power, the controller 210 may reduce the power level of the electromagnetic energy generated by the computer numerically controlled machine 100 or power off the computer numerically controlled machine 100, as discussed above. In some cases, detection of the power level of the electromagnetic energy and comparison to a threshold power level may also consider the duration of the detected energy, as regulatory guidelines may specify the power level(s) of electromagnetic energy that may be emitted from the enclosure over a given period of time. For example, a given power level of electromagnetic energy (e.g., 1 mW) may be emitted from the enclosure for a brief period without issue, whereas the same power level emitted over a sustained period (e.g., 3 seconds, 5 seconds, etc.) may exceed an allowable emission threshold. Alternatively, any omission at higher power levels (e.g., 10 mW), however brief, may exceed an allowable emission threshold. Other examples are also possible.

Still further, the controller may be configured to adjust the operation of the computer numerically controlled machine based on detection, by the one or more sensors, of electromagnetic energy that is below a lower threshold, in addition to electromagnetic energy that is above an upper threshold as discussed above. This type of lower bound may provide a basis to evaluate whether the source of the electromagnetic energy (e.g., a laser) is working as expected, and/or whether the one or more sensors and associated detection system is working as expected. For example, when the computer numerically controlled machine is operating as expected, a minimal amount of scattered electromagnetic energy may be expected to be detected by the one or more sensors. If this minimal amount of electromagnetic energy is not detected during operation of the computer numerically controlled machine (e.g., if zero electromagnetic energy is detected), it may indicate that there may be an issue with one or both of the source of the electromagnetic energy or the detection system.

The one or more sensors may be disposed on, or proximate to, the lid 130 in various ways. In some implementations, transparent portions of the lid 130 that provide a viewable window into the enclosure may be formed at least in part from an optically transmissive material (e.g., glass, clear acrylic, etc.) that uses a light guide plate or similar material arrangement. In this way, the lid 130 may be configured such that electromagnetic energy striking the optically transmissive material at any location on the lid 130 is propagated through the lid to the location of a sensor that may detect the wavelength and/or power level of the energy.

In this regard, the sensor may be coupled to the optically transmissive material of the lid 130 in various ways. For example, the electromagnetic energy propagating within the lid may be directed to a location on an edge of the optically transmissive material and a sensor (e.g., a photodiode) may be coupled to the edge of the optically transmissive material at that location using, for example, a clear epoxy, resin, or other similar interface material that is selected based on its ability to maximize the transmissibility of the electromagnetic energy to the sensor (e.g., considering its index of refraction, etc.). As another example, the photodiode or similar sensor may be positioned within a recess or a hole in the optically transmissive material of the lid 130, which may optionally act as a lens to direct the propagating light toward the sensor. There may be numerous other ways to transmissively couple the sensor to the optically transmissive material of the lid 130 as well. In some implementations, the sensor may be co-located within the enclosure with one or more other electronic devices (e.g., a lid camera) in order to share electronics and more efficiently utilize the space within the enclosure. Other examples are also possible.

Figure 5:
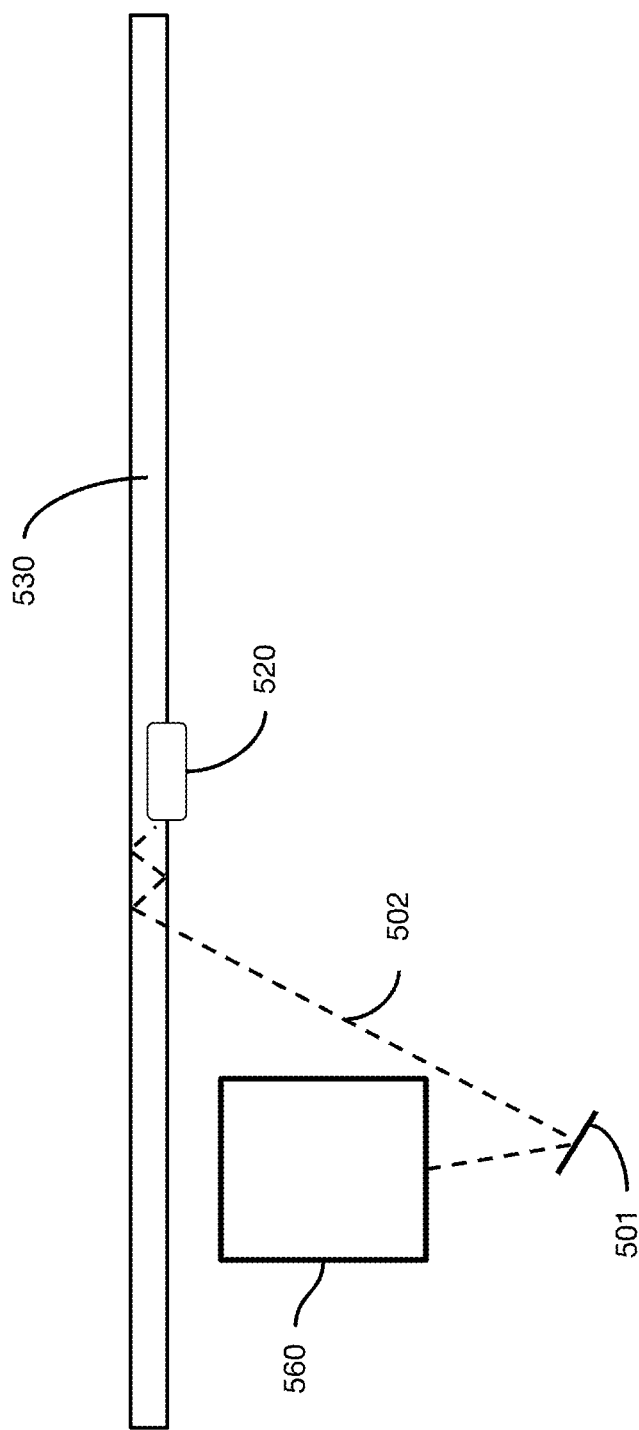
FIG. 5 depicts a schematic diagram of electromagnetic energy detected by an enclosure sensor of a computer numerically controlled machine consistent with implementations of the current subject matter.

Turning to FIG. 5, an example of this type of arrangement can be seen. As shown in FIG. 5, a schematic diagram of the interior of a computer numerically controlled machine is shown, including a head 560, which may be similar to the head 160 discussed above and shown in FIGS. 2A-2B, and a lid 530, which may be similar to the lid 130 discussed above and shown in FIGS. 1A, 1B, 2A, and 4A-4D. FIG. 5 also depicts a reflective surface 501, which may represent an object, obstruction, misalignment, or some combination thereof that serves to misdirect the electromagnetic energy beam 502 from its intended path. In this regard, it will be appreciated that the reflective surface 501 may be located anywhere along the path of the electromagnetic energy beam 502, from the emitter to the intended area to be machined. Alternatively, the reflective surface 501 may represent a material or object that may be intentionally placed within the enclosure as part of a procedure to test and/or calibrate the detection system discussed herein. For instance, the enclosure may include a designated placement location for the reflective surface 501 (e.g., a mirror) that is used when the calibration procedure is run by the computer numerically controlled machine.

As shown in FIG. 5, the electromagnetic energy beam 502 is directed by the reflective surface 501 toward the lid 530. Consistent with the discussion above, the lid 530 may be formed from an optically transmissive material such that the electromagnetic energy beam 502 propagates within the optically transmissive material toward the location of a sensor 520 (e.g., a photodiode). If the sensor 520 detects that the electromagnetic energy beam 502 is within the range of wavelengths of interest (e.g., wavelengths of 400-480 nanometers associated with blue laser) and/or exceeds a power threshold based on one or both of the amplitude and duration that is detected (or falls below a minimum power threshold), a controller of the computer numerically controlled machine may reduce the power level of the electromagnetic energy and/or terminate the output of electromagnetic energy (e.g., by powering off the computer numerically controlled machine).

Numerous other examples consistent with the discussion above are also possible. For instance, it will be appreciated that although the examples discussed above and shown in FIG. 5 refer to a sensor associated with a lid of a computer numerically controlled machine, one or more sensors may be coupled to other surfaces of the enclosure as well, including side walls, top panels that do not include the lid, the material bed, etc. As another example, the one or more sensors may be located proximate to intentional openings in the enclosure, such as a horizontal slot as discussed above that allows oversized material to be passed through the computer numerically controlled machine. Similarly, the one or more sensors may be located on or near a light curtain within the enclosure that is configured to either block electromagnetic energy (e.g., from escaping the horizontal opening) or transmit electromagnetic energy (e.g., toward a sensor). Further, the type of sensor and associated detection operations may take various other forms as well. For example, the one or more sensors may take the form of a single camera configured to detect electromagnetic energy (e.g., the lid camera 110 shown in FIG. 2A) that has a wide angle view of an area of interest (e.g., the lid, the entire enclosure, etc.), which view may be achieved using one or more mirrors. As another example, the one or more sensors may include an array of cameras.

It is possible that the one or more sensors may be configured to detect a different wavelength of electromagnetic energy that is emitted by the enclosure material when it is struck by the wavelength originally emitted by the source (e.g., laser). As one possibility, the one or more sensors (e.g., a FLIR camera, a passive infrared sensor, a temperature sensor, etc.) may be configured to detect infrared radiation (e.g., wavelengths of 700 nanometers to 1 millimeter), which may be emitted in the form of infrared (IR) radiation and/or heat when the source electromagnetic energy strikes the enclosure. As another possibility, the interior surfaces of the enclosure (e.g., sidewalls, lid, etc.) may be coated with or otherwise formed from a material that fluoresces a particular wavelength of light when it is struck by the wavelength originally emitted by the source. In this regard, the fluorescing material may be selected based on the particular wavelength being one that would not be expected to appear within the enclosure of the computer numerically controlled machine, such that any detection of the particular wavelength may be attributed to the electromagnetic energy originally emitted by the source that is reaching the enclosure material. For example, a material that fluoresces pink light in reaction to being struck by blue light. Accordingly, the one or more sensors may be configured to detect the particular wavelength of light. If detected (e.g., if detected above a threshold), the controller may modulate the operations of the computer numerically controlled machine accordingly, consistent with the discussion above.

Modulating the operations of the computer numerically controlled machine 100 in this manner may reduce or obviate the need for the enclosure to absorb the electromagnetic energy and may thus allow the enclosure to be formed from materials having a lower optical density, especially when the interior surface of the enclosure incorporates at least some materials having a light scattering property. As one example, at least some portions of the enclosure material may be formed as a relatively thin, optically transmissive material that is covered (e.g., painted) with an opaque surface on one side, similar to the example shown in FIG. 4C. Similarly, at least some portions of the enclosure material may be formed as a multilayer material including a relatively thin opaque material over a clear, optically transmissive material that is used to detect the electromagnetic energy.

As another example, a computer numerically controlled machine may include an enclosure formed from materials that are sufficiently transparent such that the interior space of the computer numerically controlled machine is visible to a user, as well as capable of absorbing the electromagnetic energy up to a given threshold (e.g., a given power level). Above this given power level, where absorbing the electromagnetic energy would otherwise require enclosure materials having an opacity such that visibility through the enclosure would be impaired, the controller may be configured to adjust (e.g., terminate) operations of the computer numerically controlled machine when the electromagnetic energy exceeding the threshold is detected by the one or more sensors of the enclosure.

Alternatively and/or additionally, when certain wavelengths of light are received at the interior surface of the lid 130 and/or transmitted through the lid 130, the controller 210 may change the optical properties of the lid 130 (or other transparent portions of the enclosure) to effect, for example, a darkening the lid 130, change in the color of the lid 130, and/or the like. This change in the optical property of the lid 130 may ensure that the enclosure exhibits a desired visual appearance, such as a color that is consistent with the operating mode of the computer numerically controlled machine 100, brand aesthetics, and/or the like. In some cases, the desired visual appearance of the enclosure may be further achieved by the controller 210 adjusting an interior lighting inside the computer numerically controlled machine 100.

Figure 6:
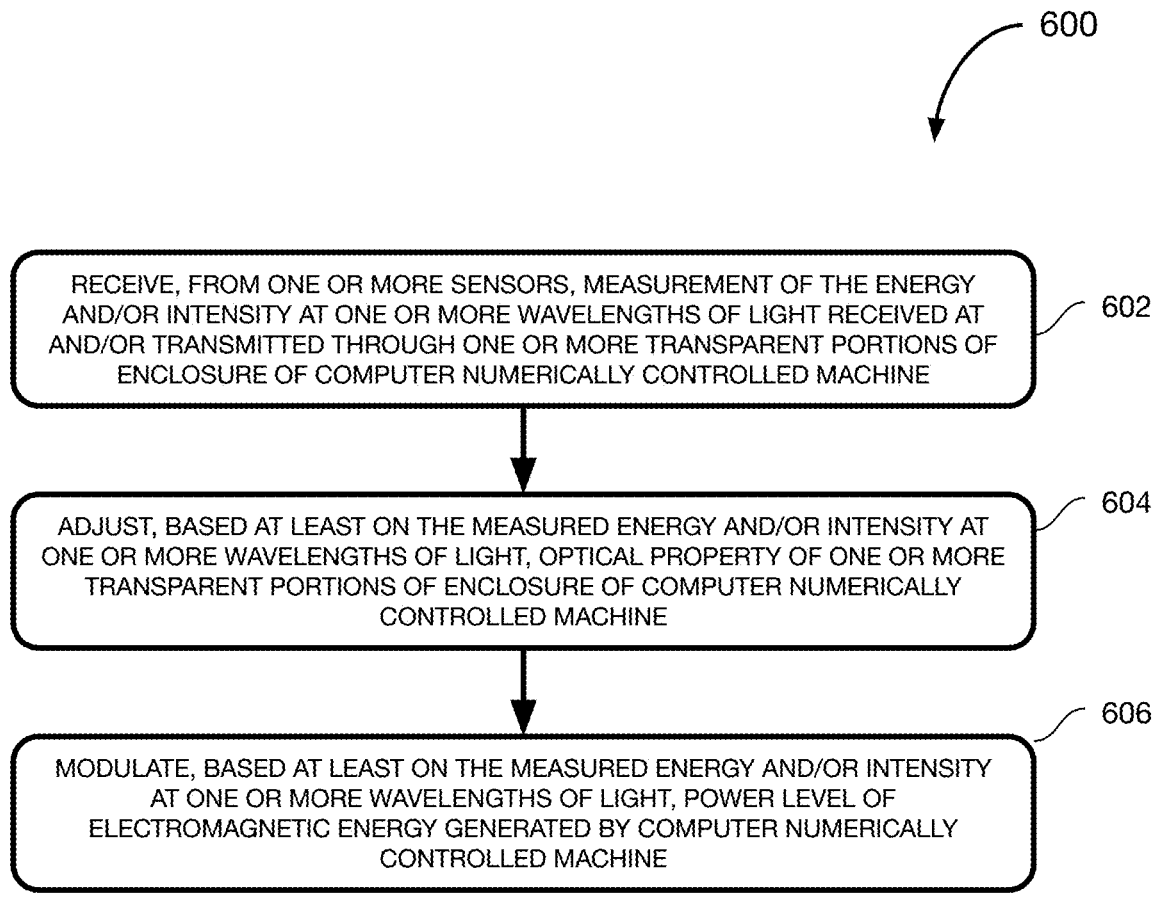
FIG. 6 depicts a flowchart illustrating an example of a process for controlling a computer numerically controlled machine consistent with implementations of the current subject matter.

FIG. 6 depicts a flowchart illustrating an example of a process 600 for controlling a computer numerically controlled machine consistent with implementations of the current subject matter. Referring to FIG. 6, the process 600 may be performed by the controller 210 to control the computer numerically controlled machine 100, for example, based on the energy or intensity of a wavelength of light that is detected as being received at and/or transmitted through one or more transparent portions of the enclosure of the computer numerically controlled machine 100 such as the lid 130.

The controller 210 may receive, from one or more sensors, a measure of energy and/or intensity at one or more wavelengths of light received at and/or transmitted through one or more transparent portions of the enclosure of the computer numerically controlled machine 100 (602). In some example embodiments, one or more sensors may be disposed inside the interior space of the computer numerically controlled machine 100 and/or outside the computer numerically controlled machine 100 to determine the lighting conditions inside and/or around the computer numerically controlled machine 100. For example, the one or more sensors may measure the energy and/or intensity at one or more wavelengths of light that is received at and/or transmitted through one or more transparent portions of the enclosure of the computer numerically controlled machine 100 such as the lid 130. The controller 210 may receive, from the one or more sensors, data corresponding to the energy and/or intensity at one or more wavelengths of light received at and/or transmitted through one or more transparent portions of the enclosure of the computer numerically controlled machine 100.

The controller 210 may adjust, based at least on the measurement of the energy and/or intensity at one or more wavelengths of light, an optical property of the one or more transparent portions of the enclosure of the computer numerically controlled machine (604). In some example embodiments, the controller 210 may adjust the optical properties of the lid 130 (or other transparent portions of the enclosure) in accordance with the lighting conditions in and/or around the computer numerically controlled machine 100. For example, the controller 210 may darken the lid 130, which may be achieved, for example, by the application of a polymer dispersed liquid crystal (PDLC) film as the coating 325 on the surface of the lid 130. Alternatively and/or additionally, the controller 210 may change the color of the lid 130.

The controller 210 may change the optical properties of the lid 130 in order to achieve and/or maintain a desired visual appearance of the enclosure even when the lighting conditions in and/or around the computer numerically controlled machine 100 undergo various changes. For instance, the desired visual appearance of the enclosure may include the lid 130 being a first color (e.g., turquoise) when the computer numerically controlled machine 100 is in a first mode of operation (e.g., powered off) and a second color (e.g., brown) when the computer numerically controlled machine 100 is in a second mode of operation (e.g., powered on with steady state illumination). The change in the optical properties of the lid 130 may thus correspond to the lighting conditions in and/or around the computer numerically controlled machine 100 such that the lid 130 may achieve and/or maintain the first color (or the second color). Otherwise, if the optical properties of the lid 130 remain fixed, changes in the lighting conditions in and/or around the computer numerically controlled machine 100 may cause the lid 130 to be in a third color instead of the first color (or the second color).

The controller 210 may modulate, based at least on the measurement of the energy and/or intensity at one or more wavelengths of light, the power level of the electromagnetic energy generated by the computer numerically controlled machine 100 (606). In some example embodiments, the controller 210 may further adjust the power level of the electromagnetic energy generated by the computer numerically controlled machine 100 in accordance with the measurement of the energy and/or intensity at a wavelength of light received at and/or transmitted through the lid 130 (or other transparent portions of the enclosure). Doing so may sure the safety and reliability of the enclosure of the computer numerically controlled machine 100 even when certain portions of the enclosure, such as the lid 130, are transparent and at least partially permeable to the wavelengths of the electromagnetic energy generated by the computer numerically controlled machine 100. For example, when the controller 210 determines that the wavelength of light received at and/or transmitted through the lid 130 corresponds to the wavelengths of the electromagnetic energy (e.g., wavelengths of 400-480 nanometers associated with blue laser), the controller 210 may reduce the power level of the electromagnetic energy and/or terminate the output of electromagnetic energy (e.g., by powering off the computer numerically controlled machine 100).

In some implementations of the current subject matter, the visual appearance of the enclosure may instead include an opaque enclosure without a transparent portion for viewing the workspace inside the enclosure. Such a design may be selected, for example, to reduce cost and/or provide a visual appearance that has a desired aesthetic visual effect. In some examples, a camera inside the enclosure of a computer numerically controlled machine (e.g., lid camera 110 of the computer numerically controlled machine 100 in FIG. 2A) may capture images that can be displayed in real-time for a user to view the workspace inside the enclosure of the computer numerically controlled machine. In one example the images are displayed on an interface (e.g., screen) of a controller deployed at the computer numerically controlled machine (e.g., controller 210a of CNC machine 100 in FIG. 3). Alternatively and/or additionally, the images may be transmitted through a network to a network connected controller (e.g., controllers 210b of server 220 and/or 210c client 230 in FIG. 3) so that the images can be displayed on an interface (e.g., screen) of a computing system (e.g., computing system 1100 of FIG. 7).

Figure 7:
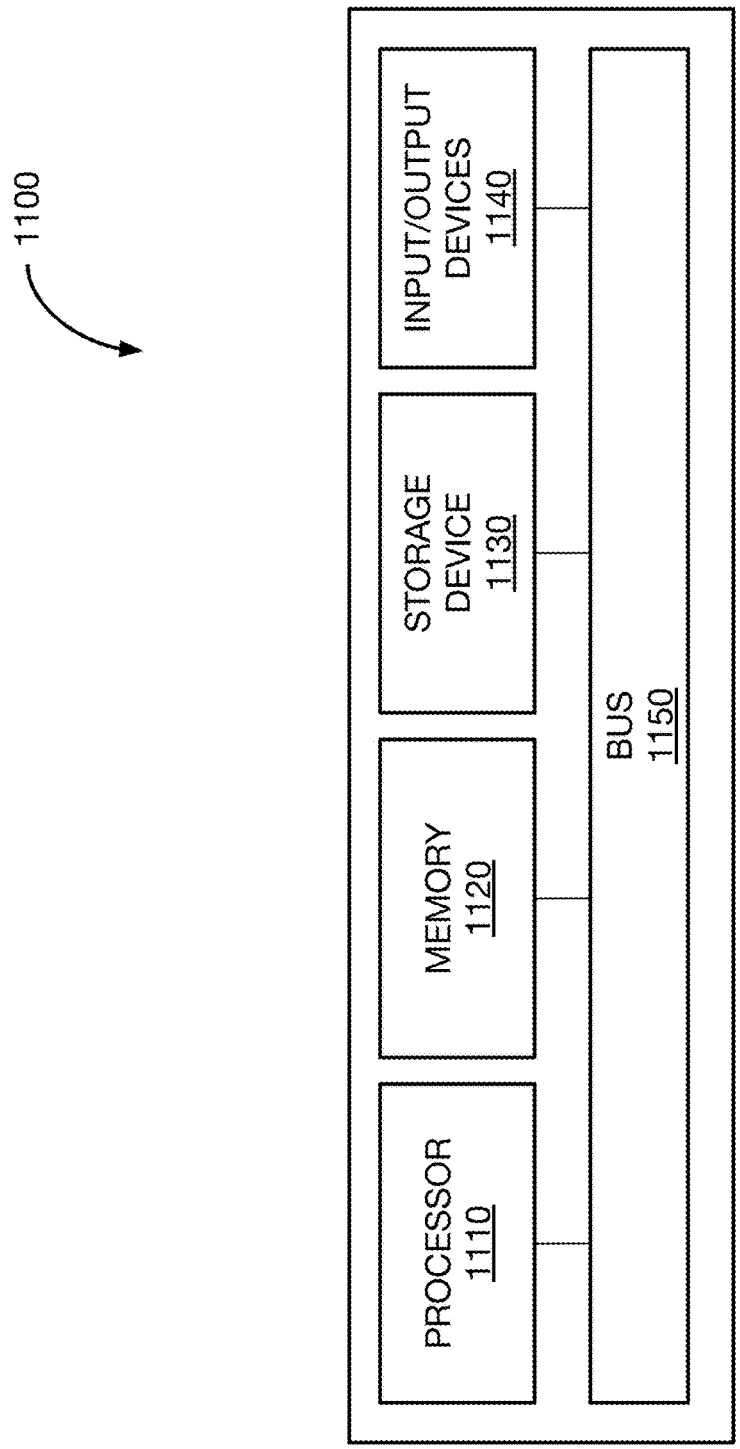
FIG. 7 depicts a block diagram illustrating a computing system, consistent with implementations of the current subject matter.

FIG. 7 depicts a block diagram illustrating a computing system 1100, consistent with implementations of the current subject matter. Referring to FIG. 7, the computing system 1100 may implement the controller at the controller 210 and/or any components therein.

As shown in FIG. 7, the computing system 1100 can include a processor 1110, a memory 1120, a storage device 1130, and an input/output device 1140. The processor 1110, the memory 1120, the storage device 1130, and the input/output device 1140 can be interconnected via a system bus 1150. The processor 1110 is capable of processing instructions for execution within the computing system 1100. Such executed instructions can implement one or more components of, for example, the controller 210. In some implementations of the current subject matter, the processor 1110 can be a single-threaded processor. Alternately, the processor 1110 can be a multi-threaded processor. The processor 1110 is capable of processing instructions stored in the memory 1120 and/or on the storage device 1130 to control at least some of the operations of the computer numerically controlled machine 100.

The memory 1120 is a computer readable medium such as volatile or non-volatile that stores information within the computing system 1100. The memory 1120 can store data structures representing configuration object databases, for example. The storage device 1130 is capable of providing persistent storage for the computing system 1100. The storage device 1130 can be a solid state drive, a floppy disk device, a hard disk device, an optical disk device, or a tape device, or other suitable persistent storage means. The input/output device 1140 provides input/output operations for the computing system 1100. In some implementations of the current subject matter, the input/output device 1140 can provide input/output operations for a network device. For example, the input/output device 1140 can include Ethernet ports or other networking ports to communicate with one or more wired and/or wireless networks (e.g., a local area network (LAN), a wide area network (WAN), the Internet).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitory, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A computer numerically controlled (CNC) machine comprising:
   a source configured to emit electromagnetic energy within an interior space of the CNC machine;
   an enclosure defining at least a portion of the interior space, the enclosure at least partially formed from an optically transmissive material, wherein the optically transmissive material is configured such that electromagnetic energy striking the optically transmissive material is propagated, within the optically transmissive material, to a location on the optically transmissive material;
   a sensor coupled to the optically transmissive material at the location;
   at least one processor;
   a non-transitory computer-readable medium; and
   program instructions stored on the non-transitory computer-readable medium that are executable by the at least one processor such that the CNC machine is configured to:
      detect, via the sensor, electromagnetic energy that exceeds at least one of a threshold duration or threshold power level; and
      based on detecting the electromagnetic energy, reduce a power level of the electromagnetic energy emitted by the source.

2. The CNC machine of claim 1, wherein the enclosure at least partially formed from an optically transmissive material comprises a light guide plate.

3. The CNC machine of claim 1, wherein the sensor comprises a photodiode.

4. The CNC machine of claim 1, wherein the optically transmissive material is configured such that electromagnetic energy striking the optically transmissive material is propagated, within the optically transmissive material, to at least two locations on the optically transmissive material, and wherein the CNC machine comprises a respective sensor coupled to the optically transmissive material at each of the at least two locations.

5. The CNC machine of claim 1, wherein the program instructions that are executable by the at least one processor such that the CNC machine is configured to detect, via the sensor, electromagnetic energy comprise program instructions that are executable by the at least one processor such that the CNC machine is configured to detect, via the sensor, a wavelength of light associated with the electromagnetic energy emitted by the source.

6. The CNC machine of claim 1, further comprising program instructions stored on the non-transitory computer-readable medium that are executable by the at least one processor such that the CNC machine is configured to:
   encode a pulse wave modulated signature in the electromagnetic energy emitted by the source; and
   wherein the program instructions that are executable by the at least one processor such that the CNC machine is configured to detect, via the sensor, electromagnetic energy comprise program instructions that are executable by the at least one processor such that the CNC machine is configured to detect, via the sensor, the pulse wave modulated signature.

7. The CNC machine of claim 1, wherein the program instructions that are executable by the at least one processor such that the CNC machine is configured to detect, via the sensor, electromagnetic energy that exceeds at least one of a threshold duration or threshold power level comprise program instructions that are executable by the at least one processor such that the CNC machine is configured to detect, via the sensor, continuous electromagnetic energy that exceeds a threshold power level for greater than a threshold sustained duration.

8. The CNC machine of claim 1, wherein the program instructions that are executable by the at least one processor such that the CNC machine is configured to detect, via the sensor, electromagnetic energy that exceeds at least one of a threshold duration or threshold power level comprise program instructions that are executable by the at least one processor such that the CNC machine is configured to detect, via the sensor, instantaneous electromagnetic energy that exceeds a maximum allowable threshold power level.

9. The CNC machine of claim 1, wherein the program instructions that are executable by the at least one processor such that the CNC machine is configured to reduce the power level of the electromagnetic energy emitted by the source comprise program instructions that are executable by the at least one processor such that the CNC machine is configured to terminate emission of electromagnetic energy by the source.

10. A non-transitory computer-readable medium, wherein the non-transitory computer-readable medium is provisioned with program instructions that, when executed by at least one processor, cause a CNC machine comprising a source configured to emit electromagnetic energy to:
   detect, via a sensor of the CNC machine, electromagnetic energy that exceeds at least one of a threshold duration or threshold power level, wherein the sensor is coupled at a location to an optically transmissive material that at least partially forms an enclosure of the CNC machine, the enclosure defining at least a portion of an interior space of the CNC machine, and wherein the optically transmissive material is configured such that electromagnetic energy striking the optically transmissive material is propagated, within the optically transmissive material, to the location; and
   based on detecting the electromagnetic energy, reduce a power level of the electromagnetic energy emitted by the source.

11. The non-transitory computer-readable medium of claim 10, wherein the optically transmissive material is configured such that electromagnetic energy striking the optically transmissive material is propagated, within the optically transmissive material, to at least two locations on the optically transmissive material, and wherein the CNC machine comprises a respective sensor coupled to the optically transmissive material at each of the at least two locations.

12. The non-transitory computer-readable medium of claim 10, wherein the program instructions that, when executed by at least one processor, cause the CNC machine to detect, via the sensor, electromagnetic energy comprise program instructions that, when executed by at least one processor, cause the CNC machine to detect, via the sensor, a wavelength of light associated with the electromagnetic energy emitted by the source.

13. The non-transitory computer-readable medium of claim 10, wherein the non-transitory computer-readable medium is also provisioned with program instructions that, when executed by at least one processor, cause the CNC machine to:
 encode a pulse wave modulated signature in the electromagnetic energy emitted by the source; and
 wherein the program instructions that, when executed by at least one processor, cause the CNC machine to detect, via the sensor, electromagnetic energy comprise program instructions that, when executed by at least one processor, cause the CNC machine to detect, via the sensor, the pulse wave modulated signature.

14. The non-transitory computer-readable medium of claim 10, wherein the program instructions that, when executed by at least one processor, cause the CNC machine to detect, via the sensor, electromagnetic energy that exceeds at least one of a threshold duration or threshold power level comprise program instructions that, when executed by at least one processor, cause the CNC machine to detect, via the sensor, continuous electromagnetic energy emitted by the source that exceeds a threshold power level for greater than a threshold sustained duration.

15. The non-transitory computer-readable medium of claim 10, wherein the program instructions that, when executed by at least one processor, cause the CNC machine to detect, via the sensor, electromagnetic energy that exceeds at least one of a threshold duration or threshold power level comprise program instructions that, when executed by at least one processor, cause the CNC machine to detect, via the sensor, instantaneous electromagnetic energy emitted by the source that exceeds a maximum allowable threshold power level.

16. The non-transitory computer-readable medium of claim 10, wherein the program instructions that, when executed by at least one processor, cause the CNC machine to reduce the power level of the electromagnetic energy emitted by the source comprise program instructions that, when executed by at least one processor, cause the CNC machine to terminate emission of electromagnetic energy by the source.

17. A method carried out by a CNC machine comprising a source configured to emit electromagnetic energy, the method comprising:
 detecting, via a sensor of the CNC machine, electromagnetic energy that exceeds at least one of a threshold duration or threshold power level, wherein the sensor is coupled at a location to an optically transmissive material that at least partially forms an enclosure of the CNC machine, the enclosure defining at least a portion of an interior space of the CNC machine, and wherein the optically transmissive material is configured such that electromagnetic energy striking the optically transmissive material is propagated, within the optically transmissive material, to the location; and
 based on detecting the electromagnetic energy, reducing a power level of the electromagnetic energy emitted by the source.

18. The method of claim 17, further comprising:
 encoding a pulse wave modulated signature in the electromagnetic energy emitted by the source; and
 wherein detecting, via the sensor, electromagnetic energy emitted by the source comprises detecting, via the sensor, the pulse wave modulated signature.

19. The method of claim 17, wherein detecting, via the sensor, electromagnetic energy that exceeds at least one of a threshold duration or threshold power level comprises detecting, via the sensor, continuous electromagnetic energy emitted by the source that exceeds a threshold power level for greater than a threshold sustained duration.

20. The method of claim 17, wherein causing the CNC machine to reduce the power level of the electromagnetic energy emitted by the source comprises causing the CNC machine to terminate emission of electromagnetic energy by the source.

* * * * *